(12) United States Patent
Naum

(10) Patent No.: US 6,272,269 B1
(45) Date of Patent: Aug. 7, 2001

(54) OPTICAL FIBER/WAVEGUIDE ILLUMINATION SYSTEM

(75) Inventor: Daniel Naum, Eugene, OR (US)

(73) Assignee: DN Labs Inc., Eugene, OR (US)

( * ) Notice: Subject to any disclaimer, the term of this patent is extended or adjusted under 35 U.S.C. 154(b) by 0 days.

(21) Appl. No.: 09/441,034

(22) Filed: Nov. 16, 1999

(51) Int. Cl.[7] ............................ G02B 6/26; G02B 6/42
(52) U.S. Cl. ............................ 385/43; 385/33; 385/901; 362/551; 362/556
(58) Field of Search .................. 385/43, 42, 33, 385/4, 12, 116, 143, 901; 372/108; 362/551, 552, 554, 555, 583, 581, 559

(56) References Cited

U.S. PATENT DOCUMENTS

| | | |
|---|---|---|
| 4,425,599 | 1/1984 | Rieder et al. . |
| 4,704,660 | 11/1987 | Robbins . |
| 5,067,831 | 11/1991 | Robbins et al. . |
| 5,298,327 | 3/1994 | Zarian et al. . |
| 5,400,225 | 3/1995 | Currie . |
| 5,579,429 | 11/1996 | Naum . |
| 5,619,194 | * 4/1997 | Belfer .................................. 362/559 |

* cited by examiner

Primary Examiner—Phan T. H. Palmer
(74) Attorney, Agent, or Firm—David S. Alavi

(57) ABSTRACT

A fiber optic illumination system includes a light source, a waveguide, and an optical fiber. One or more lamps and/or solid-state devices may be employed as the light source. The waveguide includes a straight collecting segment, a tapered condensing segment, and a straight homogenizing segment, may be fabricated from fused silica as a single monolithic component, conveys light from the light source to the optical fiber by transmission and/or internal reflection, and may be provided with UV and/or IR blocking filter coating(s). The optical fiber may be colorless or fluorescent optical fiber. Light transmitted by the optical fiber may be delivered to any one or more of a variety of light output devices, including diffusive flat panels, diffusive rods or wands, fluorescent light emitting converters, projectors, spectrum generators, and so on.

39 Claims, 27 Drawing Sheets

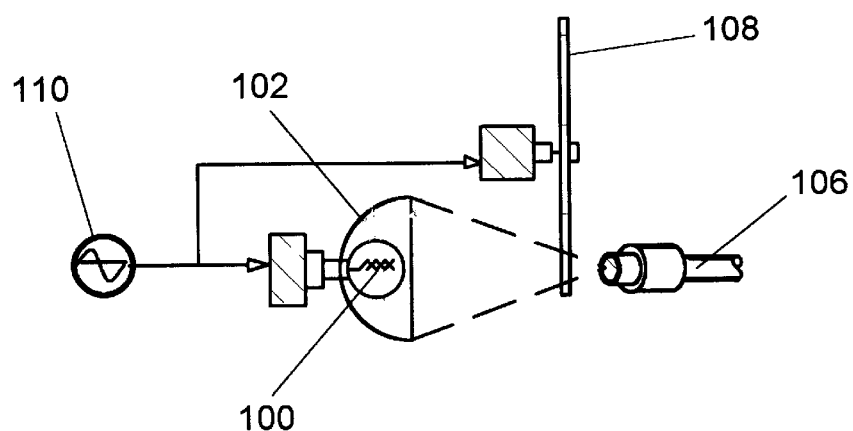
FIG. 1
PRIOR ART
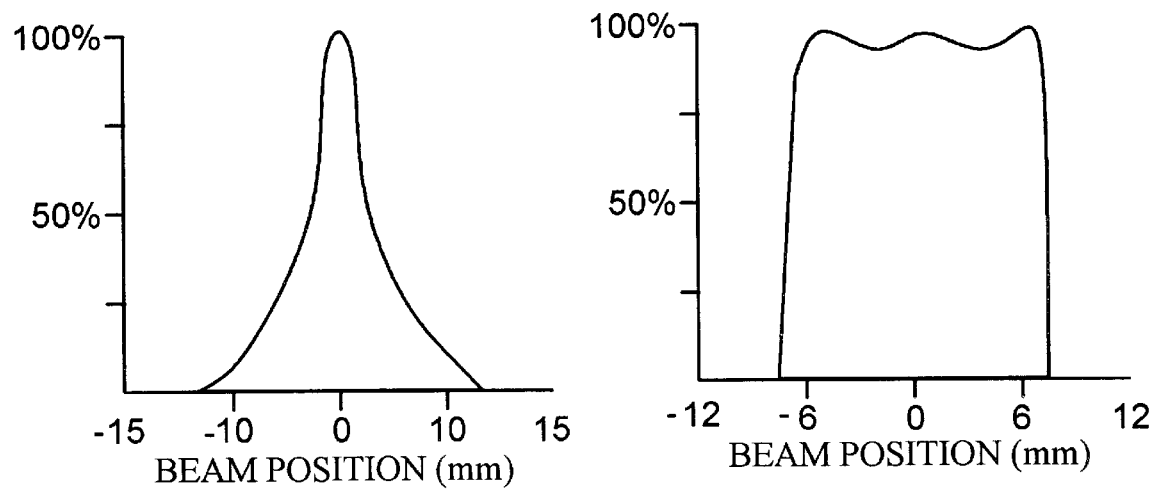
FIG. 2
PRIOR ART
FIG. 8

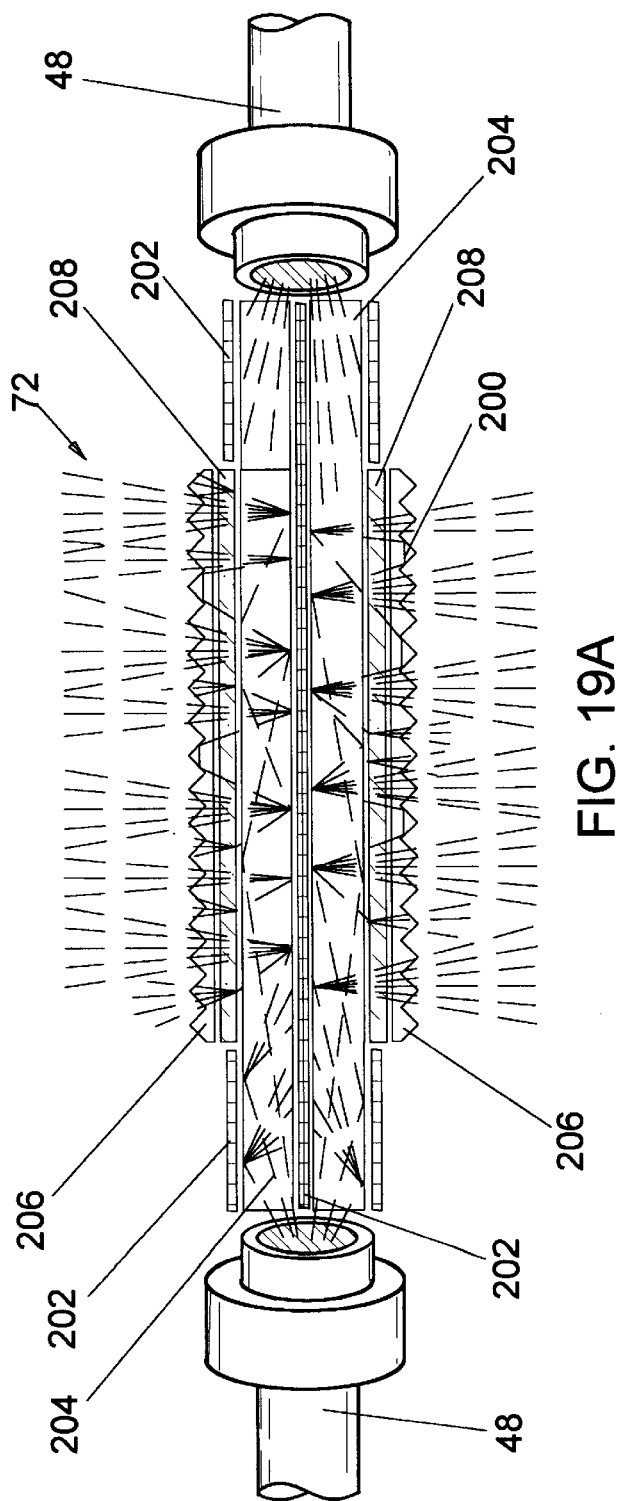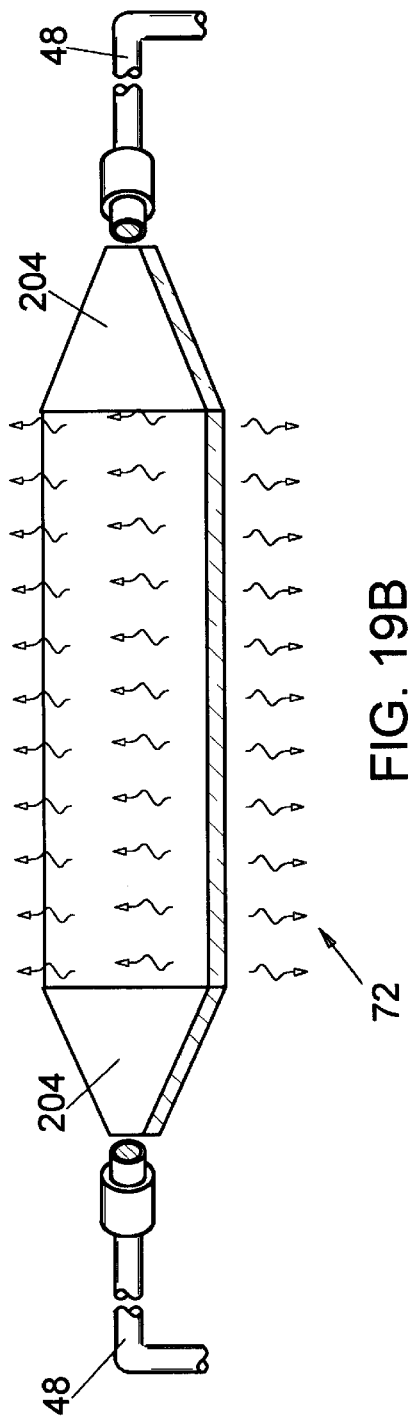
FIG. 19A
FIG. 19B

OPTICAL FIBER/WAVEGUIDE ILLUMINATION SYSTEM

FIELD OF THE INVENTION

The present invention relates generally to fiber optic illuminators and, more particularly, to the use of waveguides for collecting, condensing and homogenizing light from a source and coupling the light into the optical fiber more efficiently. Various light sources, such as lamps, solid-state light sources (gallium nitride or other light emitting diodes for example) and/or fluorescent optical fiber, in conjunction with mixing waveguides, can be employed to produce a large array of colors, including white light, for pumping and/or coupling into colorless and/or fluorescent optical fiber for general illumination purposes.

BACKGROUND

A traditional approach for coupling light from a lamp or other light source into an optical fiber is to concentrate the light at the focal point of an elliptical or parabolic reflector, as generally illustrated in FIG. 1. A typical illuminator employs a lamp as the light source 100, an elliptical reflector 102, a power source 110, and in some cases a motorized color wheel 108. The light from lamp 100 is focused by elliptical reflector 102 onto the input end of an optical fiber 106. Optical fiber 106 is typically a polymeric type fiber optic cable with a relatively large core (between about 1 mm and about 30 mm in diameter) and a jacket (or cladding, typically polytetrafluoroethylene or other polymer or material) having a lower refractive index than that of the core. The recommended service temperature for this type of optical fiber is less than about 80° C., although where the polymeric optical fiber employs a cross-linked polymer the service temperature may be as high as is 120° C. and even as high as 150° C. intermittently. These types of optical fiber are disclosed in detail in U.S. Pat. No. 5,298,327, U.S. Pat. No. 5,579,429, and U.S. Pat. No. 5,067,831. Each of said patents is hereby incorporated by reference as if fully set forth herein.

Unfortunately, typical lamps (such as tungsten halogen lamps and arc lamps) are extended light sources (due to the finite size of the filament or arc, as the case may be), whereas reflectors function most efficiently when the light source is a point source that can be efficiently collected by the reflector and focused to a small spot on the end of the optical fiber. Optical fibers used typically have a core diameter of between about 3 mm and about 15 mm. Filaments and arcs usually cannot be focused efficiently to such a small spot; they are typically focused to larger spots having an intensity distribution peaked in the center and decreasing towards the edges. FIG. 2 illustrates a typical elliptical reflector output from a tungsten halogen lamp having a filament 5 mm long. The focused spot size is approximately 20 mm in diameter, and if such a spot is coupled into a 12 mm core optical fiber a substantial amount of light is lost due to the spot over-filling the core. Also, the intensity distribution over the surface of the optical fiber must be kept to a level sufficiently low so as not to exceed the maximum service temperatures as described above. If the illumination spot from the reflector is too intense, the fiber end may overheat and burn. Therefore, the peak of the intensity distribution shown in FIG. 2 must be kept below a burning threshold, and the remainder of the input area of the optical fiber cannot be illuminated as intensely as the center and the brightness level of the optical fiber output would be correspondingly reduced. The alignment between the lamp, reflector, and optical fiber is of critical importance when using elliptical type reflectors, and when the illuminator requires service or a new lamp is installed re-alignment becomes necessary, since even few millimeters of variation in the filament or arc position results in substantial reduction of optical fiber light output.

Infrared and ultraviolet radiation generated by the lamp must be managed. The ultraviolet radiation can degrade polymeric optical fiber at the input end, thereby substantially reducing light coupling into the fiber optic. Ultraviolet radiation can also photochemically transform certain types of optical fiber into brittle optical fiber, which can be easily broken or cracked. Infrared radiation can cause additional heating at that the input end of the fiber optic, possibly leading to overheating and/or burning of the optical fiber.

The illuminator configuration of FIG. 1 is typically most useful for relatively low power illuminators or applications where relatively low illumination levels are sufficient. Similar illuminator configurations are described in U.S. Pat. No. 4,704,660, U.S. Pat. No. 4,425,599, and U.S. Pat. No. 5,400,225. Each of said patents is hereby incorporated by reference as if fully set forth herein.

Other methods have been used to increase the coupling efficiency of the light from the light source into the optical fiber. One or more lenses located near the input end of the fiber or between the light source and the fiber input end have been used with some success in illuminators having a light source approximating a point source. However, for higher power illuminators where the light source is larger, the light source still cannot be efficiently imaged onto the small core of the fiber input end, and a substantial fraction of the light is lost as described above.

It is therefore desirable to provide an illuminator in which high intensity illumination may be efficiently coupled into and transmitted through an optical fiber. It is therefore desirable to provide an illuminator in which high intensity illumination may be coupled into and transmitted through the optical fiber without overheating and/or burning the optical fiber. It is therefore desirable to provide an illuminator in which ultraviolet and/or infrared radiation are substantially eliminated from the light input into the optical fiber. It is desirable to provide an illuminator wherein various wavelength components may be selected for output from the illuminator.

SUMMARY

Certain aspects of the present invention may overcome one or more aforementioned drawbacks of the previous art and/or advance the state-of-the-art of optical-fiber-coupled illuminators, and in addition may meet one or more of the following objects:

To provide a fiber optic illuminator using internally reflecting waveguides;

To provide a fiber optic illuminator with multiple output ports using internally reflecting waveguides;

To provide a fiber optic illuminator using internally reflecting waveguides and light sources of up to 1,300,000 lumens luminous flux and/or a color temperature up to 5600 K;

To provide a fiber optic illuminator using internally reflecting waveguides and providing relatively high levels of pumping light for colorless and/or fluorescent optical fiber for general illumination applications;

To provide a fiber optic illuminator using internally reflecting waveguides and solid-state light sources for pumping colorless and/or fluorescent optical fiber;

To provide a fiber optic illuminator using internally reflecting waveguides and solid-state light sources for pumping fluorescent optical fiber to generate white light within the core of the fiber suitable for illumination applications;

To provide a fiber optic illuminator using internally reflecting waveguides and solid-state light sources with phosphorus blend coating for generating white light for pumping colorless and/or fluorescent optical fiber;

To provide a fiber optic illuminator using internally reflecting waveguides and solid-state light sources, each driven by digital-to-analog converters (DACs) and a computer interface, for pumping clear and/or fluorescent optical fiber;

To provide a fiber optic illuminator employing a diffraction grating as a wavelength selector; and To provide a fiber optic illuminator employing a diffraction grating as a wavelength selector, wherein light from the illuminator selected by the diffraction grating is transmitted by a secondary optical fiber.

One or more of the foregoing objects may be achieved in the present invention by an illumination system comprising: a) a light source; b) at least one internally reflecting optical waveguide; and c) at least one optical fiber. The waveguide comprises (preferably in a single monolithic optical device fabricated primarily from fused silica or other high-temperature-resistant transparent material): an ultraviolet-blocking filter coating on the end facing the light source (i.e., the input end of the waveguide); a collector for collecting light from the source over the largest permissible solid angle without the need for reflectors, that can be closely coupled to the light source due to high temperature tolerance of the waveguide material; a condenser where the light rays from the collector element are condensed by total internal reflection from the tapered surfaces of the condenser to increase light intensity; a homogenizer where the condensed light rays are homogenized by multiple internal reflections and from which the transmitted light exits substantially uniformly over the exit surface area of the waveguide; and an infrared-blocking filter coating on the end facing the fiber optic (i.e., the output end of the waveguide) that reduces transmission of radiation of wavelength longer than about 750 nm.

The light source may be any of a variety of light sources, including but not limited to: arc lamps (including, as examples, short arc xenon lamps, low pressure long arc xenon lamps, HMI or hydrargyrum medium arc length iodide lamps), filament lamps (including, for example, tungsten-halogen lamps), flash lamps, light-emitting diodes (LED's) including but not limited to gallium nitride (GaN) and aluminum indium gallium phosphide (AlInGaP), and laser diodes. In particular, fused silica may be used at operating temperatures up to about 1200° C., therefore enabling use of a very high power lamps (such as a 12 kW HMI lamp) to be employed in an illumination system according to the present invention.

One or more of the foregoing objects may be achieved in the present invention by an illumination system comprising: a) a primary optical fiber for transmitting light from a light source; b) a diffraction grating for selecting (by diffraction) a wavelength component of the transmitted light; and c) a secondary optical fiber for transmitting the diffracted wavelength component of the light.

Additional objects and advantages of the present invention may become apparent upon referring to the preferred and alternative embodiments of the present invention as illustrated in the drawings and described in the following written description and/or claims.

BRIEF DESCRIPTION OF THE DRAWINGS

FIG. 1 shows a prior art fiber optic illumination system.

FIG. 2 shows an optical fiber input intensity distribution for a prior art fiber optic illumination system.

FIG. 8 shows an optical fiber input intensity distribution for a fiber optic illumination system according to the present invention.

FIGS. 19A and 19B are perspective and cross-sectional views, respectively, of a flat scattering panel according to the present invention.

DETAILED DESCRIPTION OF PREFERRED AND ALTERNATIVE EMBODIMENTS

The present document discloses a novel optical fiber illuminator employing an optical waveguide, the waveguide comprising internally reflecting collector, condenser, and homogenizing segments. This document further discloses various illumination applications using the optical waveguide/fiber illuminator with a variety of light sources (arc lamps, filament lamps, solid state sources, and so forth), with colorless and/or fluorescent optical fiber, and with a variety of light output devices that may include a wavelength selector. A diffraction grating may be employed as a wavelength selector and used to couple the selected wavelength(s) into a secondary optical fiber.

In prior art documents it is evident that insufficient attention has been devoted to investigating the actual correlation between standard mathematical formulas which apply to fiber optic illuminator design and actual behavior of such fiber optics. The following aspects need to be considered for an optical fiber to be used in an illuminator (i.e., "pumped" by the light source): input and output angles, photometric acceptance angle, and mathematical numerical aperture and acceptance angle. For example, mathematical calculations for numerical aperture (NA) of an optical fiber with a cladding jacket can be calculated using the following formula:

$$NA = (n_f^2 - n_c^2)^{1/2}$$

where $n_f$ is optical fiber core refractive index and $n_c$ is the cladding refractive index. The acceptance angle $\theta_{max}$ can be calculated using the following formula:

$$\theta_{max} = 2 \sin^{-1}(NA) = 2 \sin^{-1}(n_f^2 - n_c^2)^{1/2}$$

The calculated mathematical acceptance angle for a typical polymeric optical fiber with polytetrafluoroethylene jacket is 81°. This result is of limited value in the design and/or use of an optical fiber illuminator, since the calculated mathematical acceptance angle often differs greatly from the actual acceptance cone of the optical fiber.

Figure 3:
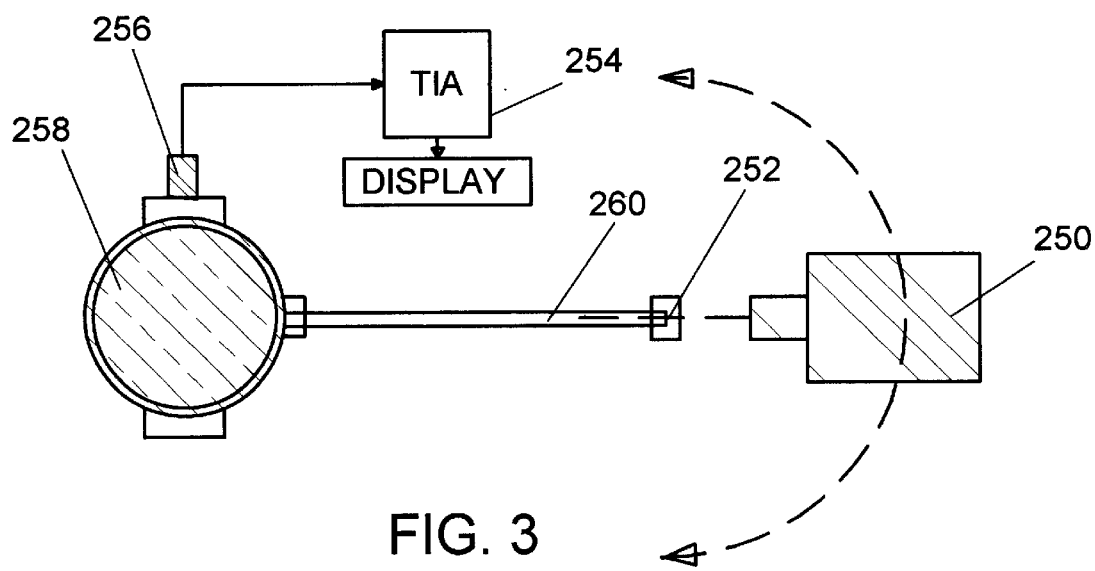
FIG. 3 shows a fiber optic test apparatus.

FIG. 3 shows a test method and apparatus devised to accurately test the relative light output intensity of a polymeric optical fiber as a function of the input angle. The apparatus comprises a stabilized laser 250 with an output wavelength of 633 nm mounted on a pivoting arm capable of pivoting ±45°. At the pivot point the input end 252 of a 12 mm core polymeric optical fiber 260 with polytetrafluoroethylene (PTFE) jacket was installed, and the output end of the fiber fed into 15 cm integrating sphere 258 with a 99% internal reflective coating. The light output from the optical fiber is integrated in the sphere and detected by a precision silicon detector 256, the output from the detector is amplified by a transimpedance amplifier 254, and the resulting output voltage is displayed on a digital voltmeter. The optical fiber 260 under test was 5 meters long with core diameter of 12 mm. The light from the laser incident on the center of the fiber and the transmitted optical power was recorded and plotted at 5° intervals from −45° to +45° (0° corresponding to normal incidence on the fiber input end).

Figure 4:
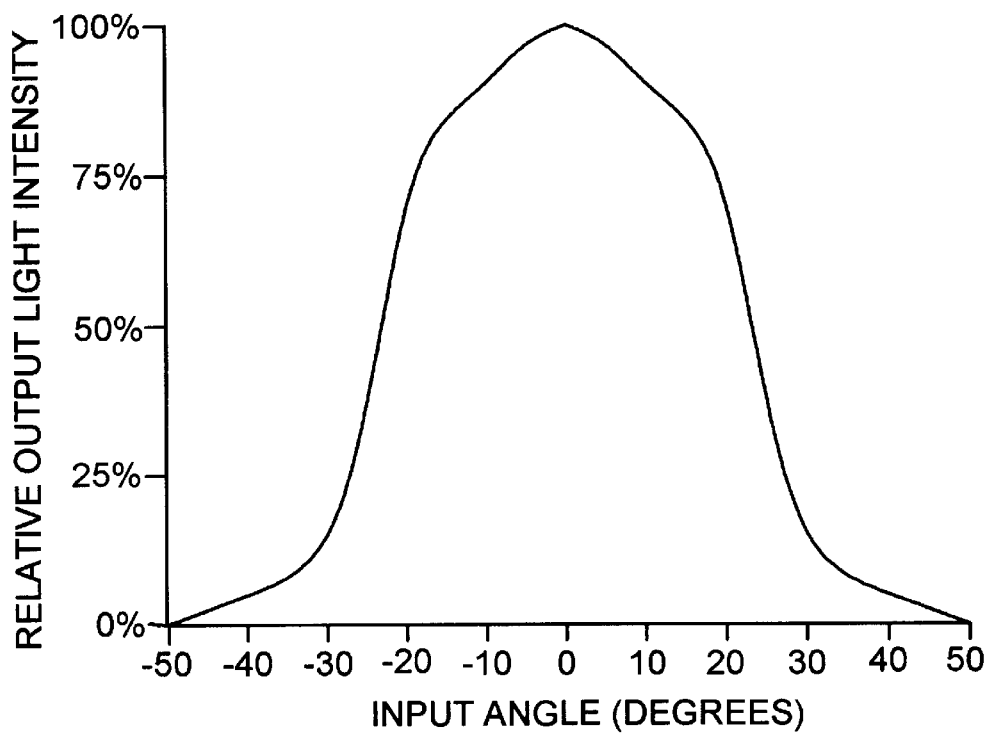
FIG. 4 shows fiber optic test data.

The results are shown on the graph in FIG. 4. The mathematical acceptance angle calculated using the formula above is 81°. The experimental acceptance angle was measured as the angular range over which the optical fiber power transmission was greater than 50% of the transmission at normal incidence, which for the fiber in question was ±22°, or a total of 44°. Clearly the useful acceptance angle for the fiber is substantially smaller than the calculated acceptance angle.

Figure 5:
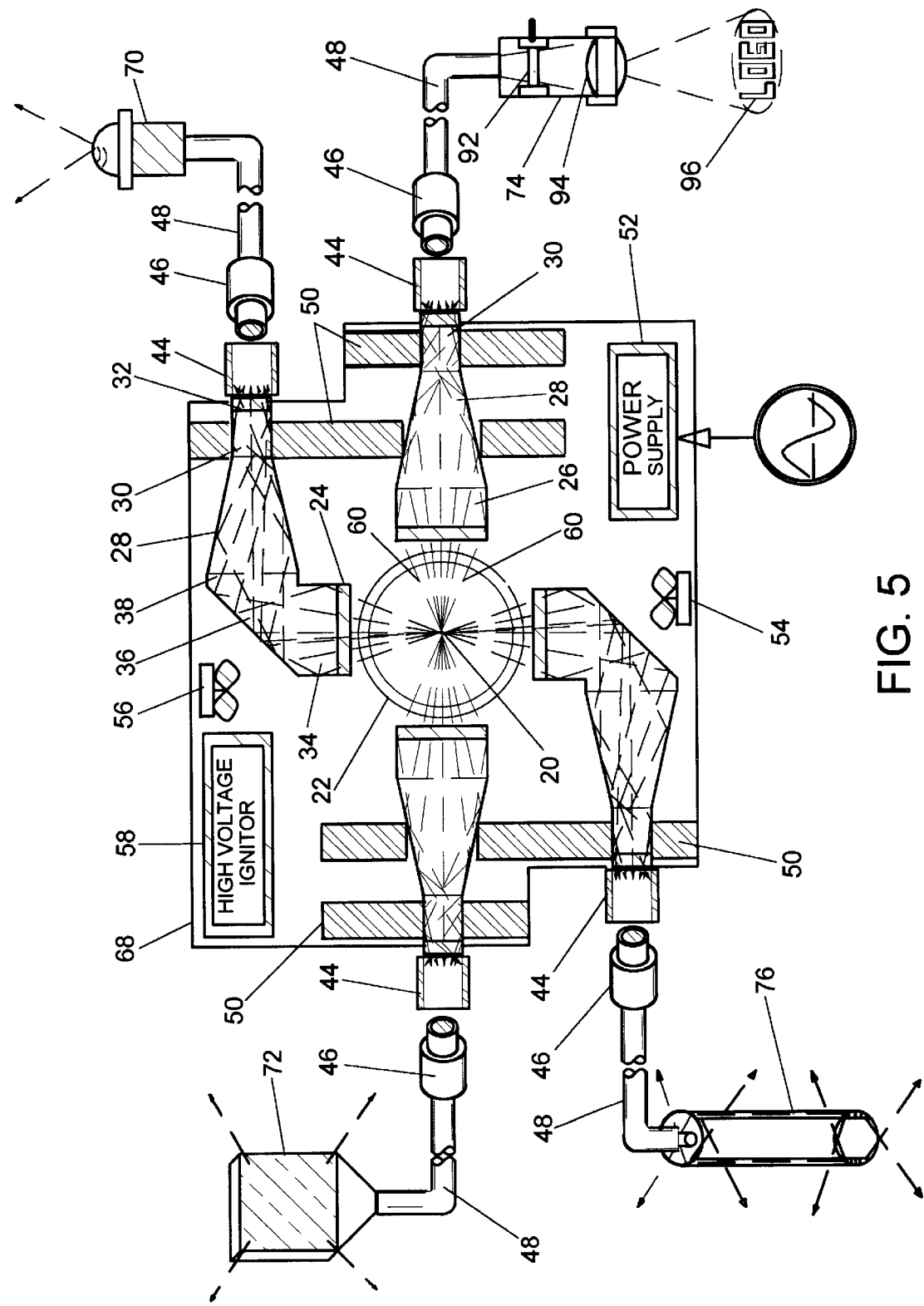
FIG. 5 is a top view of a fiber optic illuminator according to the present invention.
Figure 6:
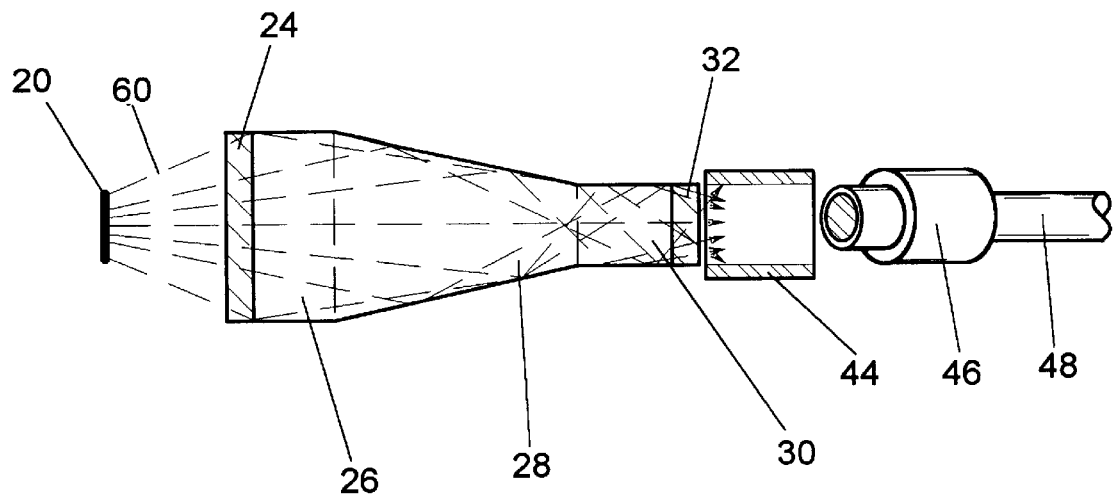
FIG. 6 is a side view of a waveguide according to the present invention and an arc of an arc lamp.
Figure 7A:
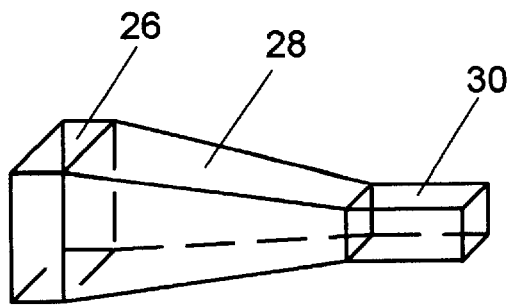
FIGS. 7A, 7B, and 7C show various embodiments of a waveguide according to the present invention.
Figure 7B:
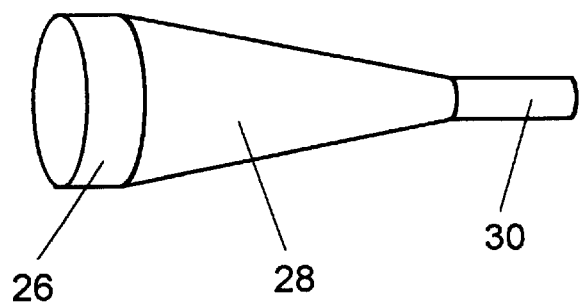
Figure 7C:
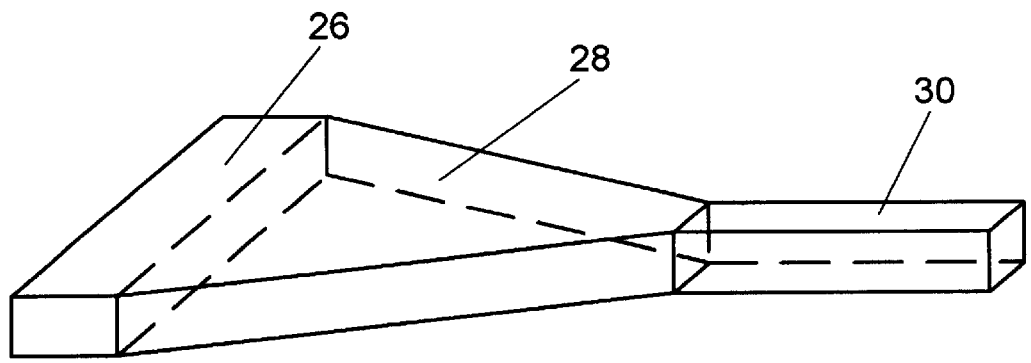

FIG. 5 shows an illuminator according to the present invention using an arc lamp as the light source. Arc 20 radiates light in a nearly spherical pattern, except where shaded above and below by the lamp electrodes in a cone-like pattern having a half-apex angle of about 20°. The light from the arc is transmitted through lamp envelope 22, through ultraviolet filter coating 24 (applied to the input face of collecting segment 26 and which reflects the ultraviolet component of the light, thereby protecting the waveguide and/or the optical fiber), into collecting segment 26 of the waveguide. Other infrared, visible, and/or ultraviolet coatings may be employed if desired for a particular illumination application. The waveguide is preferably fabricated from fused silica, preferably as a single monolithic optical component. Collecting segment 26 of the waveguide captures the light from the arc over solid angle 60 without employing any external reflectors. FIG. 6 shows a waveguide of the present invention with light from arc 20 to be coupled into the optical fiber 48. The suitable arc/waveguide parameters in FIG. 6 are related according to the equation $$d \approx l + 2 f \tan(\theta_{in}/2)$$

where d is the diameter of the collecting segment 26 of the waveguide, l is the length of the arc 20 of the lamp, and f is the distance from arc 20 to the input face of collecting segment 26. The light incident on the input face of collecting segment 26 is transmitted by total internal reflections through collecting segment 26 (which has a refractive index in the visible region of about 1.5 if fabricated from fused silica, and is surrounded by air having a refractive index of essentially 1). The transverse profile of collecting segment 26 may be circular, elliptical, oval, rectangular, square, or any other shape suitable for the geometry of a particular light source (several examples are shown in FIGS. 7A, 7B, and 7C). The transverse profile of collecting segment 26 remains substantially constant over its length. Collecting segment 26 is preferably between about 3 mm wide and about 100 mm wide, and between about 2 mm long and about 150 mm long. Collecting segment 26 is most preferably be between about 5 mm wide and about 50 mm wide, and between about 10 mm long and about 100 mm long.

Condensing segment 28 of the waveguide transmits the light from collecting segment 26 and condenses the light by total internal reflections. The input end of condensing segment 28 has a transverse profile substantially the same as that of collecting segment 26. The transverse profile of the output end of condensing segment 28 is smaller than the transverse profile of its input end. The transverse profile of condensing segment 28 must therefore taper from the input end to the output end, preferably at a taper angle of between about 0.5° and about 20°, most preferably between about 2° and about 12°. (Taper angle here is defined as the angle between a side surface of the condensing segment and an imaginary line parallel to the longitudinal axis of the waveguide.) The light intensity at the output end of the condensing segment 28 is higher than at the input end.

The output end of condensing segment 28 is connected to homogenizing segment 30, which has a transverse profile substantially corresponding to the transverse profile of the output end of condensing segment 28 and optical fiber 48. The transverse profile of homogenizing segment 30 remains substantially constant over its length. Homogenizing segment 30 transmits the light from the condensing segment by multiple total internal reflections, resulting in a relatively more uniform, homogenized light distribution over the output area of the waveguide. FIG. 8 shows a graphic representation of the relatively uniform light output over the output surface of homogenizing segment 30, and should be contrasted to FIG. 2. Homogenizing section 30 is preferably between about 5 mm long and about 100 mm long, and most preferably between about 20 mm long and about 80 mm long. The transverse profile of homogenizing segment 30 of the waveguide should preferably correspond to the transverse profile of the optical fiber 48, thereby providing minimal light loss. Optical fiber 48 preferably has a core diameter of between about 1 mm and about 30 mm, most preferably between about 3 mm and about 15 mm. The output surface of homogenizing segment 30 may be provided with an infrared filter coating 32 to prevent infrared radiation from reaching the optical fiber input face. The output surface of homogenizing segment 30 may be provided with additional infrared, visible, and/or ultraviolet filter coatings if desired for a particular illumination application. Additional infrared, visible, and/or ultraviolet filters (not shown) may be inserted between the waveguide and input end of the optical fiber if desired for a particular illumination application.

The folding waveguides shown in FIG. 5 operate in a similar way but also provide a 90° bend using a monolithic waveguide with an internal right angle prism. The collected light is transmitted through ultraviolet filter 24 into a first collecting segment 34 which transmits light by internal reflections as described above, and the light is then folded about 90° by total internal reflection within waveguide turning segment 36. The light is then transmitted through a second collecting segment 38, condensing segment 28, homogenizing segment 30, and infrared filter 32 before being coupled into optical fiber 48.

The illuminator may employ multiple waveguides to capture more of the light from the light source. The wave guides may be internally supported by ceramic and Teflon® mounts 50. The lamp power supply 52 and ignitor 58 may be internally housed, or may be externally housed for remote operation. The internal components and housing 68 of the illuminator may be cooled by forced air using any suitable fans 54 and 56. The illuminator may be provided with output ports provided with receptacles 44 for receiving the input end of optical fiber 48, which may be provided with a plug adaptor 46. Receptacle 44 and plug 46 may serve to align homogenizing segment 30 and the input end of optical fiber 48 for efficient coupling of light from the waveguide into the optical fiber.

Figure 10:
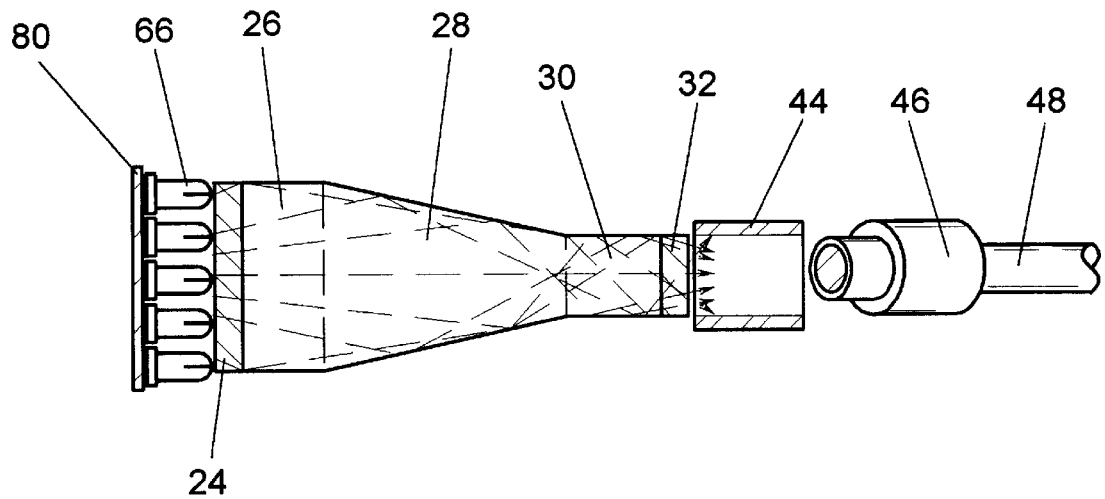
FIG. 10 is a side view of a waveguide according to the present invention and a plurality of LED's.
Figure 9:
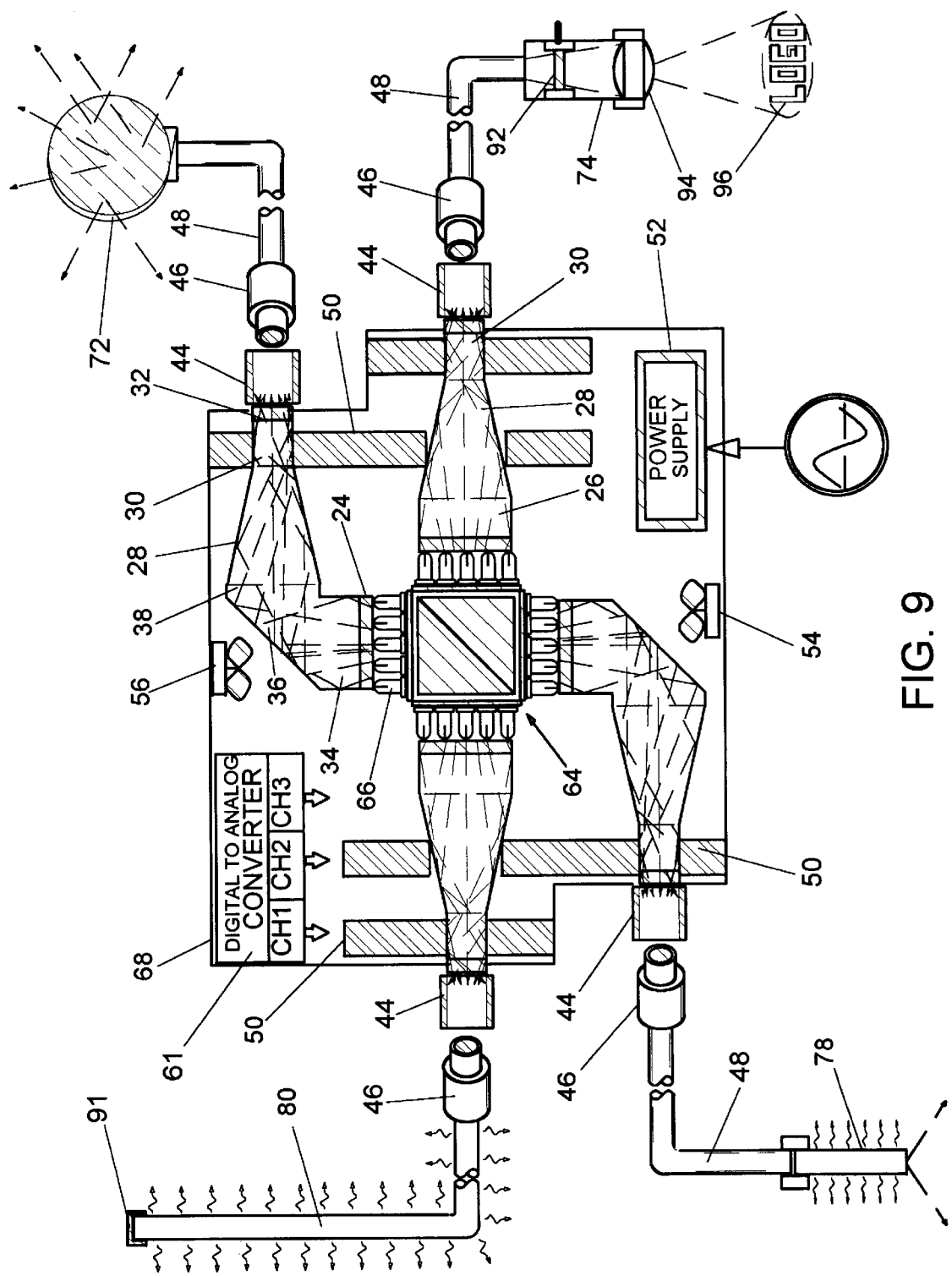
FIG. 9 is a top view of a fiber optic illuminator according to the present invention.

FIGS. 9 and 10 show an illuminator according to the present invention employing an array of solid-state devices 66 as the light source 64. Solid-state light sources 66 may be gallium nitride (GaN) and/or aluminum indium gallium phosphide (AlInGaP) light emitting diodes (LED's). Without departing from inventive concepts disclosed and/or claimed herein, any suitable type of solid-state light source, or plurality thereof, may be employed in light source 64. A variety of solid-state sources may be employed together, each emitting light at one of a plurality of primary colors. Alternatively, white-light-emitting LED's may be employed. FIG. 10 shows the individual solid state light sources 66 mounted on a printed circuit board 80 and positioned at the input end of collecting segment 26. Light from solid-state sources 66 is collected by collecting segment 26, condensed by condensing segment 28 (where mixing of the plurality of primary colors begins to occur), and homogenized and further mixed by homogenizing segment 30. By using a suitable combination of solid-state devices 66 producing a combination of primary colors, a variety of secondary colors may be produced at the output end of homogenizing segment 30 and transmitted to optical fiber 48. Using blue, green, yellow, and/or red LED's, and controlling the light output level of each of these primary colors independently, a wide array of different secondary colors may be produced, including white light.

A driving circuit (not shown) typically includes a power voltage regulator which provides accurate and stable voltage output despite varying input voltage. The voltage regulator circuit section can deliver several amps of direct current to field effect transistors (FET's), which in turn drive the LED's. The gate of the FET's is driven by a pulse generator, typically a programmable timer integrated circuit capable of producing pulses varying in width from about 10 nanosecond to continuous. The circuit described above can be controlled using a internal or external computer and a digital-to-analog converter 61 to produce different light output levels from the LED's at each of the primary colors. The secondary color produced at the output end of homogenizing segment 30 and delivered to optical fiber 48 may therefore be controlled, as well as such light output characteristics as color temperature, strobing or continuous operation, and overall light intensity. The control circuit disclosed herein is exemplary only, and shall not be construed as limiting the scope of inventive concepts disclosed and/or claimed herein. Any suitable means may be employed for driving/controlling solid-state light sources 66.

Figure 11:
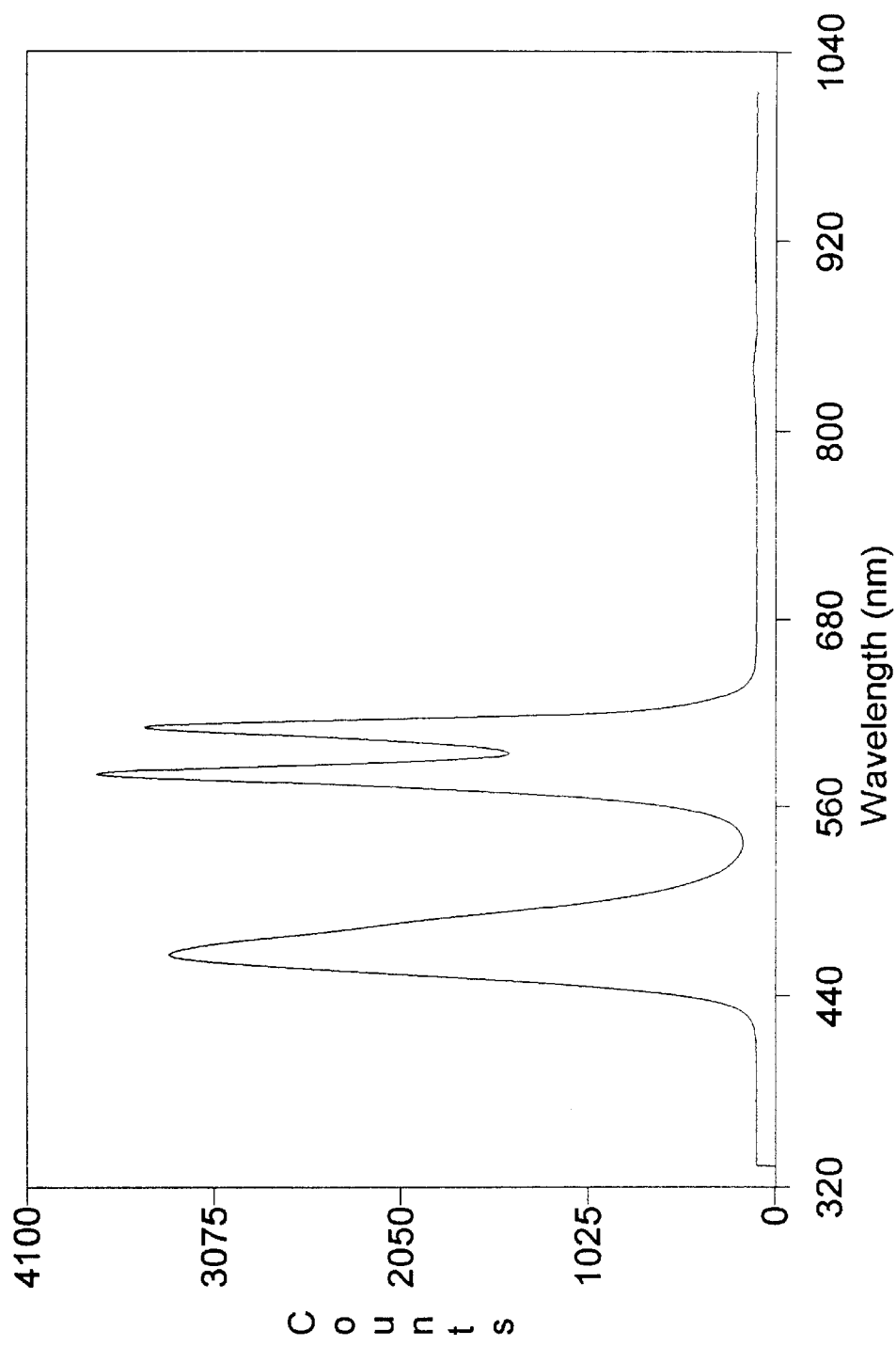
FIG. 11 shows a spectral distribution of the output of a fiber optic illuminator according to the present invention.

FIG. 11 shows a spectral distribution of light from the output end of a 12 mm core diameter 5 m long colorless optical fiber pumped by the mixed output of the illuminator using an array of solid-state LED's emitting at 465 nm, 613 nm, and 576 nm. Specific voltage amplitudes may be generated by the digital-to-analog converters so that the light output from the fiber appears white. Alternatively, the digital-to-analog converter 61 (typically capable of 8- to 24-bit operation) can generate a multiplicity of secondary colors by driving each of the arrayed primary-color-emitting LED's at differing voltage levels. If each of three digital-to-analog converter is capable of generating 256 voltage levels to drive the arrayed LED's at each of three primary colors, millions secondary colors may be generated.

Figure 12:
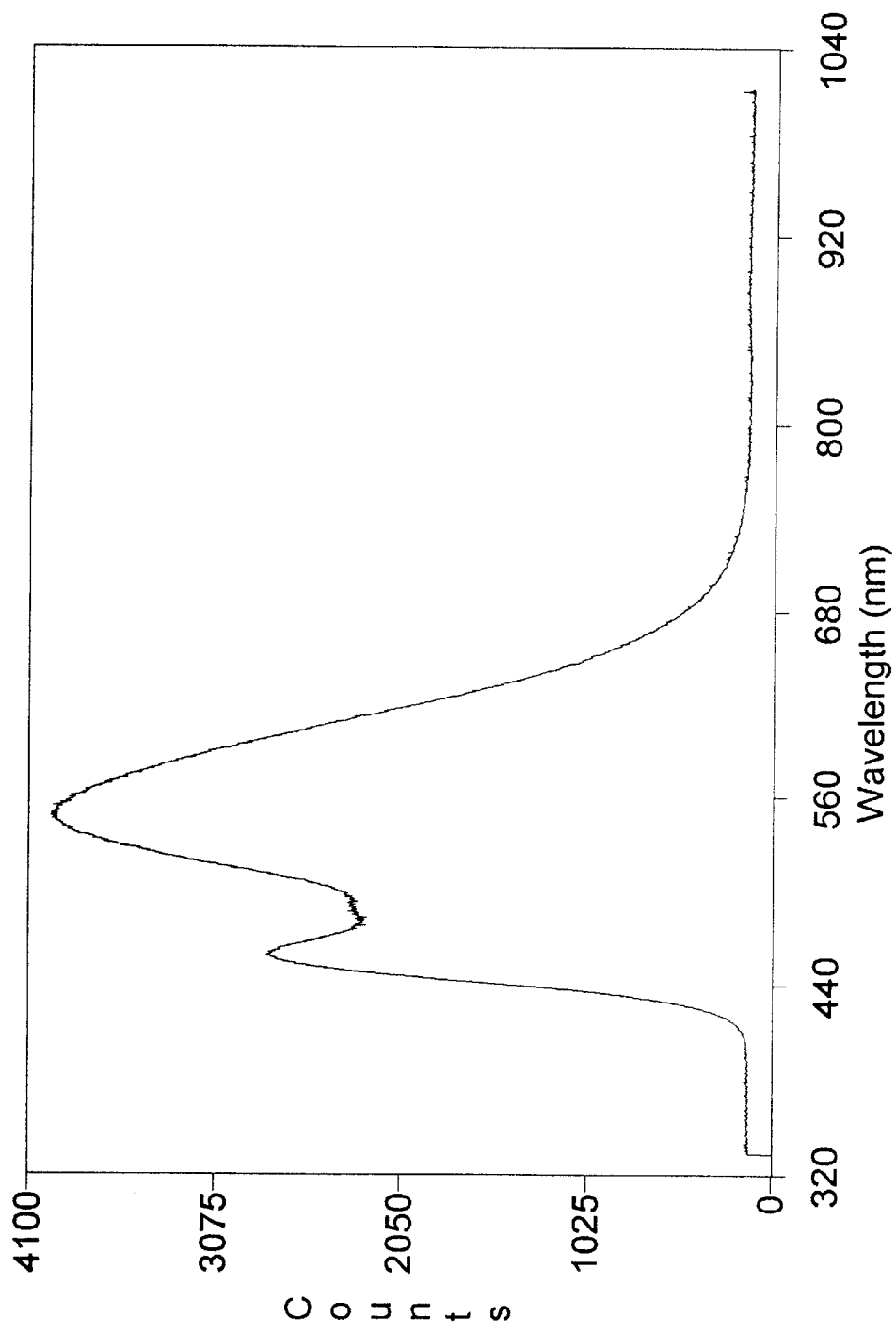
FIG. 12 shows a spectral distribution of the output of a fiber optic illuminator according to the present invention.

The light output from the solid-state illuminator is coupled into optical fiber 48 which may be colorless (i.e., substantially transparent over substantially all of the visible portion of the spectrum), or alternatively may absorb one or more of the primary colors and fluoresce at a secondary color (described further hereinbelow). The colorless optical fiber may be pumped using one or more single-color solid-state light sources in the illuminator (as described hereinabove) or solid-state white-light-emitting diodes. Such white-light-emitting diodes are typically based on a GaN or other short wavelength LED in combination with one or more luminescent dyes absorbing a portion of the LED emission and in turn emitting at one or more longer wavelengths. A GaN blue-light-emitting diode may be provided with a coating impregnated with one or more organic dyes which when excited by the blue light emit red, green and/or yellow light. The solid state white light device can be used as a surface mount chip or embedded in an epoxy resin matrix. The resulting mixture of colors (emitted by the LED and the dyes) is visible as white light having a spectral distribution as shown in FIG. 12 (measured at the output end of a 12 mm core diameter colorless optical fiber with an integrating sphere and a spectrophotometer with a resolution of 1.5 nm).

Figure 13:
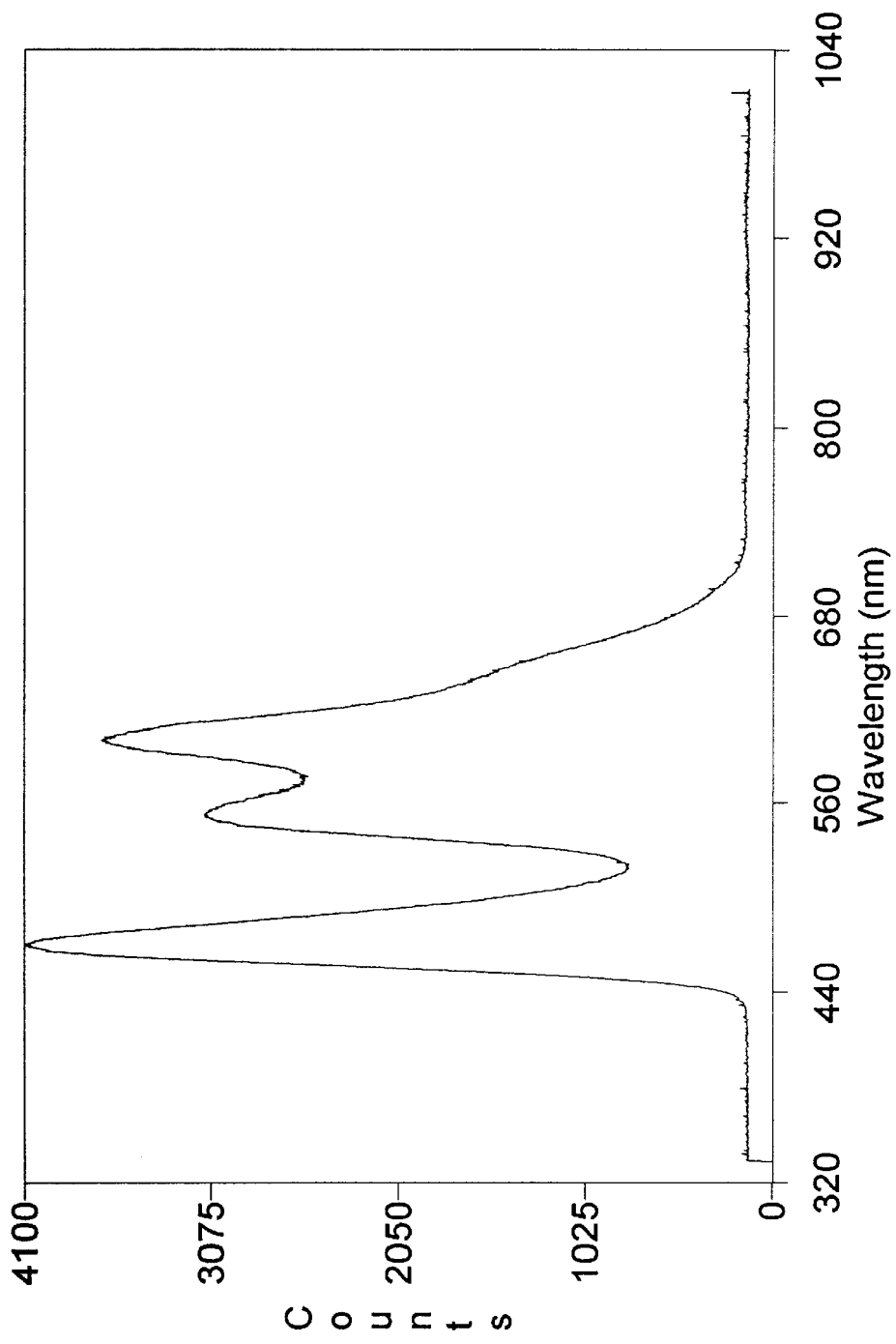
FIG. 13 shows a spectral distribution of the output of a fiber optic illuminator according to the present invention.

An alternative method for producing white light from a solid-state illuminator involves the use of a GaN or other short wavelength LED to pump fluorescent optical fiber. Such fluorescent optical fiber is disclosed in U.S. Pat. No. 5,579,429, said patent being hereby incorporated by reference as if fully set forth herein. A portion of the blue light from the illuminator is not absorbed by the fiber and provides the blue component necessary to generate white light. The rest of the blue light from the illuminator is absorbed by organic dyes doped into the polymeric core of the fluorescent optical fiber. The fiber may be doped with a mixture of luminescent dyes which emit green, yellow, and/or red secondary colors, and which have absorption spectra overlapping the emission spectrum of the LED. FIG. 13 shows a spectral distribution of white light from the output end of a 12 mm core diameter fluorescent optical fiber of the type described above (measured with an integrating sphere and spectrophotometer with a resolution of 1.5 nm). It should be noted that such fluorescent fibers may also emit light from the sides of the optical fiber, and are therefore suitable for side-illumination as well as end-illumination applications.

Figure 14:
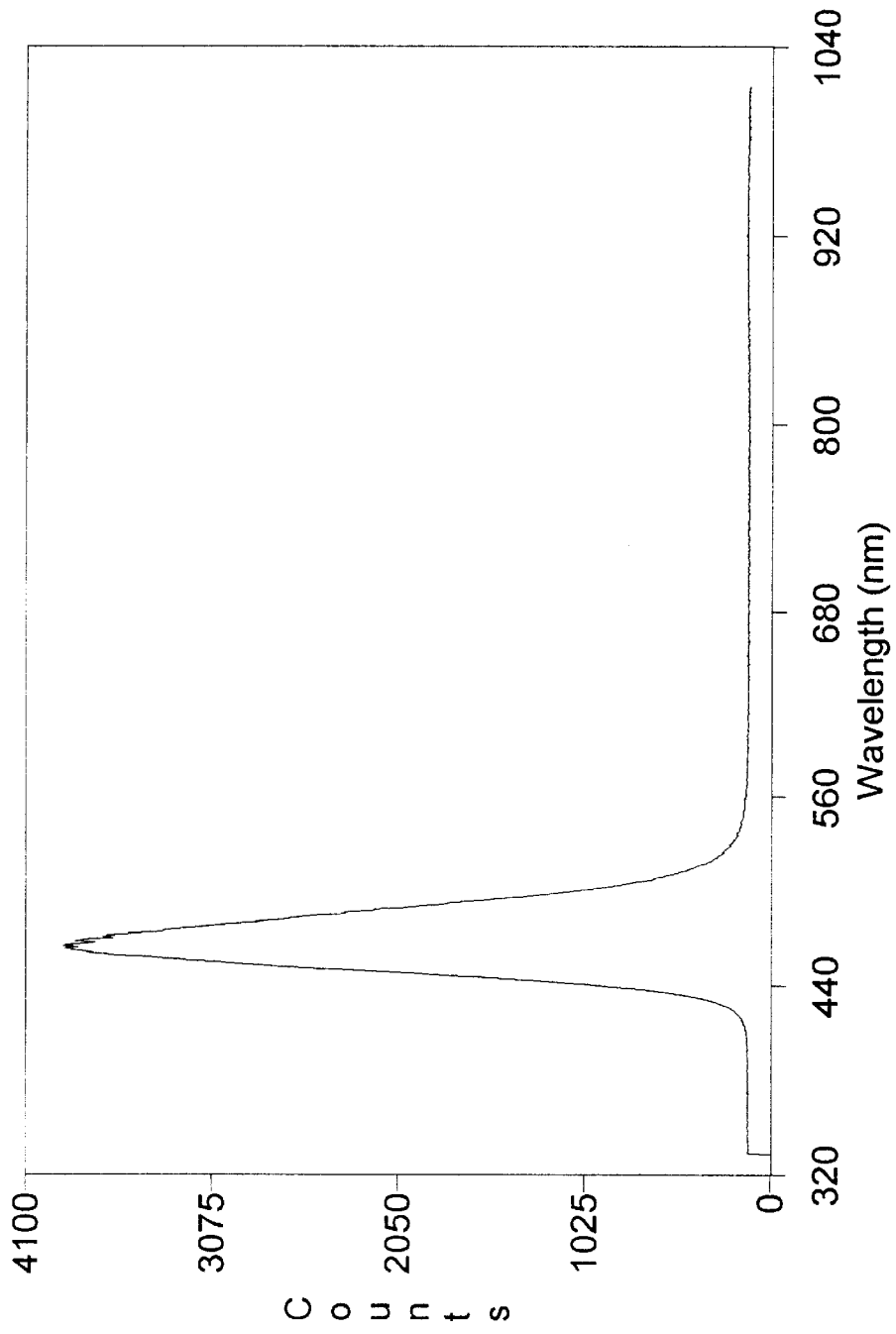
FIG. 14 shows a spectral distribution of the output of a fiber optic illuminator according to the present invention.
Figure 15:
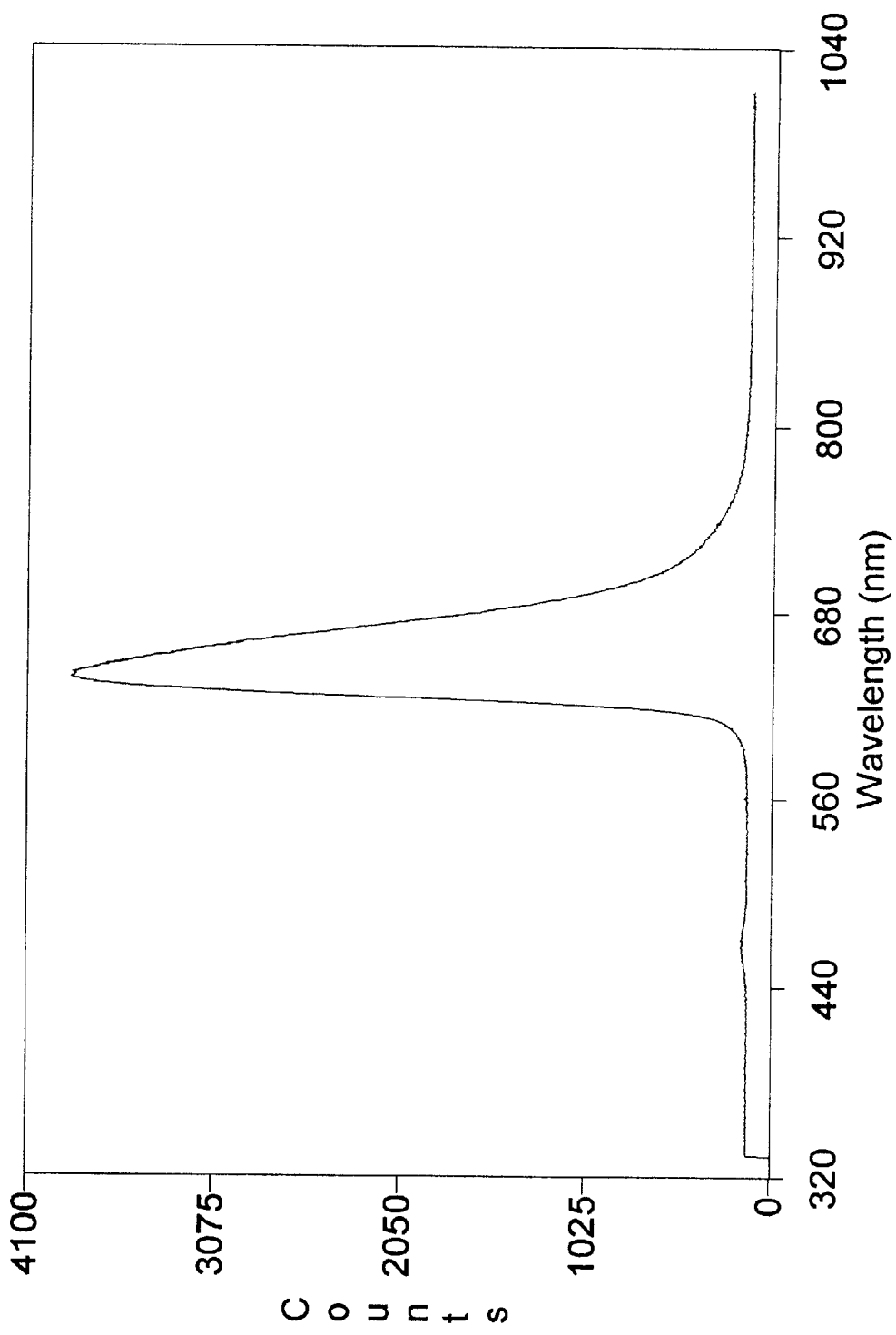
FIG. 15 shows a spectral distribution of the output of a fiber optic illuminator according to the present invention.
Figure 16:
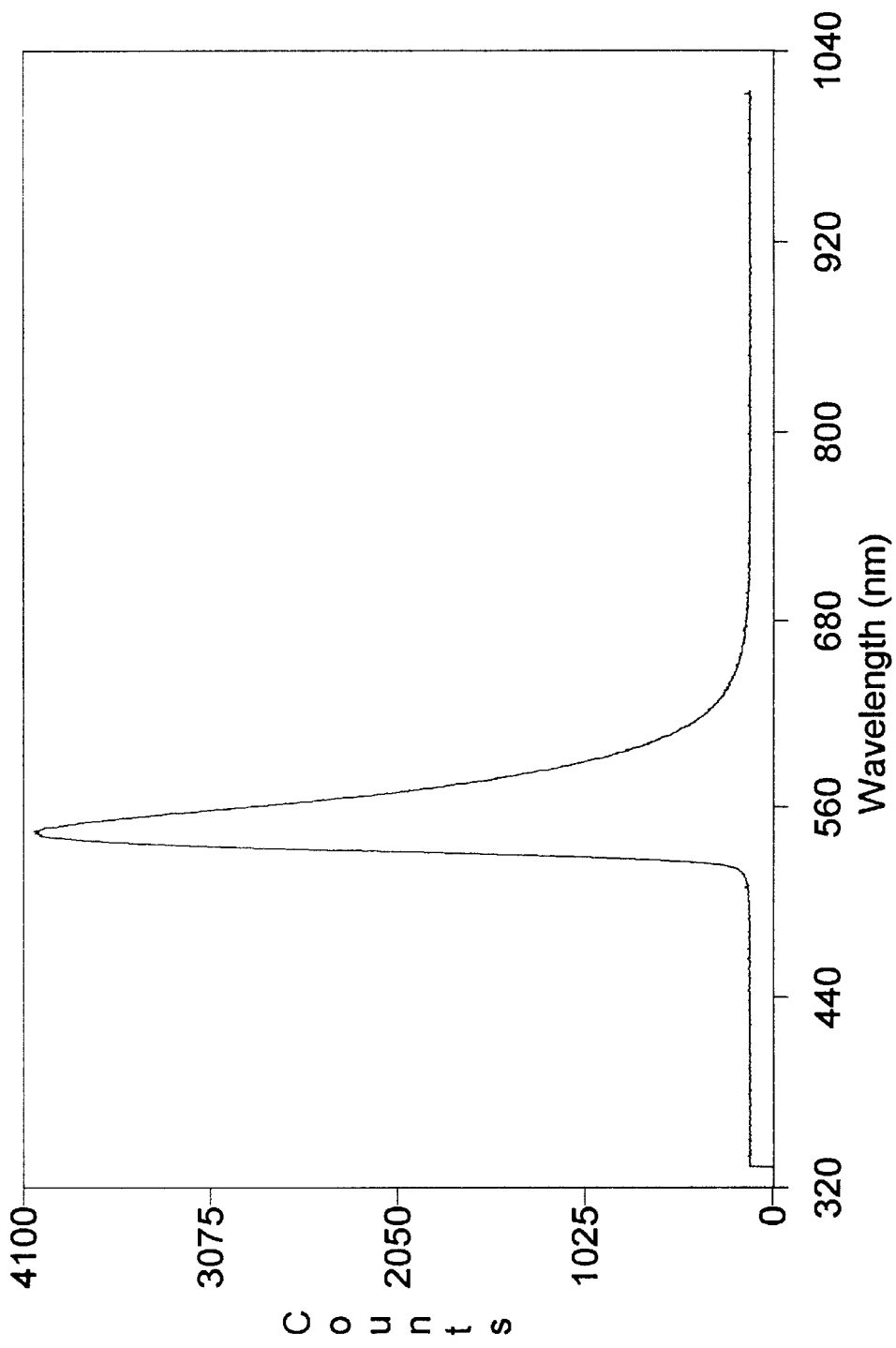
FIG. 16 shows a spectral distribution of the output of a fiber optic illuminator according to the present invention.
Figure 17:
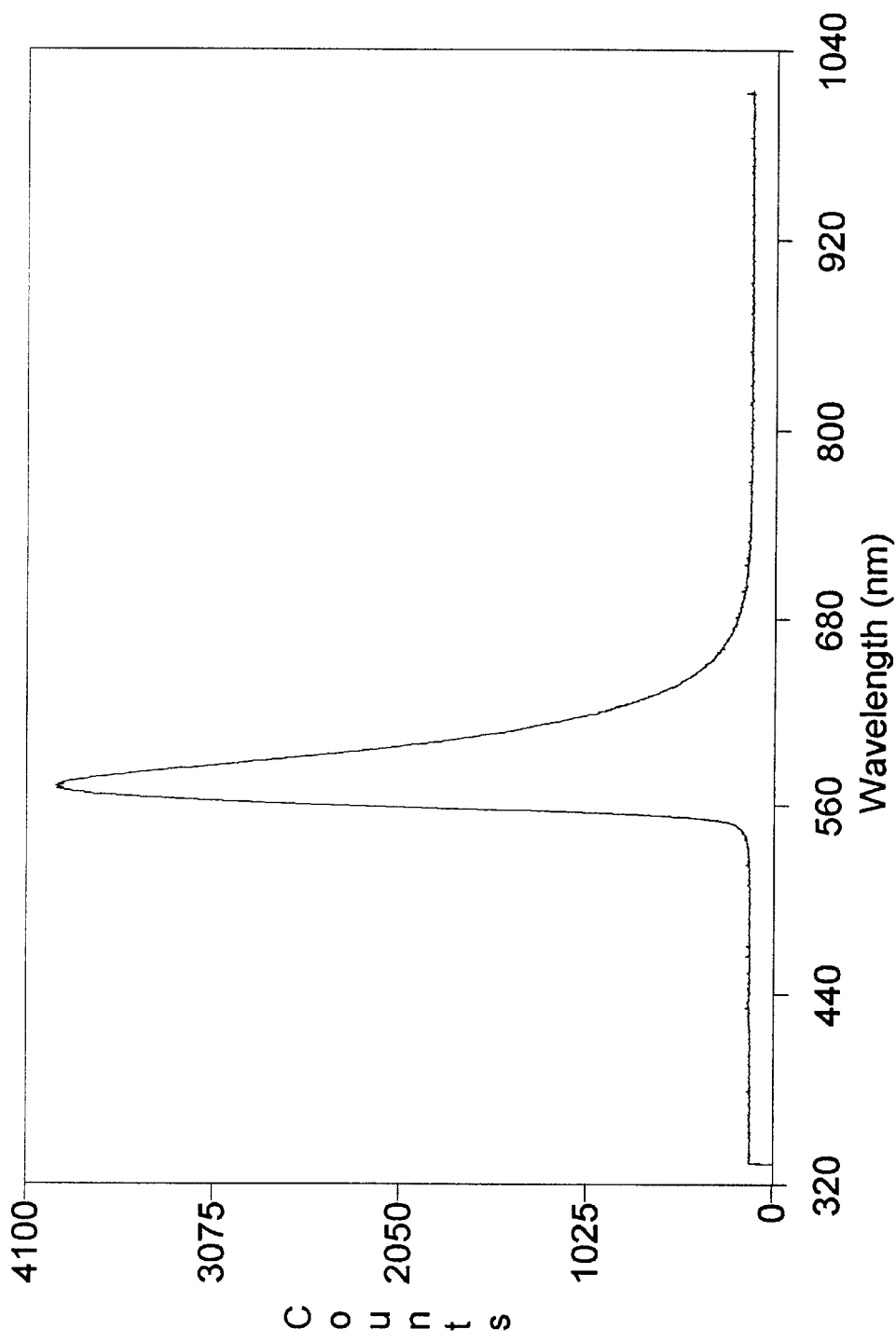
FIG. 17 shows a spectral distribution of the output of a fiber optic illuminator according to the present invention.

Single secondary colors may also be generated by the fluorescent optical fiber, as described in U.S. Pat. No. 5,579,429 (cited hereinabove), when pumped by the illuminator shown in FIG. 9. Examples of spectral distributions of the light from the output end of various fluorescent optical fibers using GaN LED's emitting at 465 nm are shown in FIGS. 14 through 17. FIG. 14 shows the spectral distribution of the GaN LED centered near 465 nm. FIG. 15 shows the spectral distribution of light from the output end of a fluorescent fiber which is pumped by the 465 nm blue output from the illuminator, wherein the polymeric optical fiber core is doped with a high quantum efficiency dye completely absorbing the 465 nm light and radiating red light centered near 638 nm. The light-emitting material which has the ability to convert light at shorter wavelengths into light at longer wavelengths may be called a "light-emitting converter" or LEC. Another example of an LEC optical fiber output spectral distribution is shown in FIG. 16 and is centered near 545 nm (yellow/green light). Another example of an LEC optical fiber output spectral distribution is shown in FIG. 17 and is centered near 573 nm (yellow/orange light). In the example of FIG. 17, the 465 nm pump light was transmitted through 5 meters of colorless 12 mm core diameter optical fiber terminating in a 150 mm long section of 12 mm core diameter fluorescent optical fiber (a remote LEC). The forgoing examples are exemplary only, and should not be construed as limiting the scope of inventive concepts disclosed and/or claimed herein. Any suitable light source and an optical fiber doped with any suitable luminescent dye emitting at any desired wavelength may be employed without departing from inventive concepts disclosed and/or claimed herein.

FIGS. 5 and 9 show the output ends of optical fibers 48 connected to various light output devices for various illumination applications. Various light output device are described in more detail hereinbelow.

Light from the illuminator may be transmitted by optical fiber 48 to a simple lens or lens system 70 to provide simple directional illumination.

Light from the illuminator may be transmitted through optical fiber 48 to pump planar light panels 72. Such panels may be a rugged flat devices which radiate light substantially uniformly from the surface, and are illustrated in FIGS. 18A, 18B, 19A, and 19B. A flat light panel can be used in areas where uniform diffuse light for ambient or task lighting is needed, and may be particularly useful for explosion-proof lighting in aircraft, marine, automotive, and/or military applications. The flat panels are typically about 6 mm to about 15 mm thick, which makes them suitable for medical instruments, point of purchase displays, and/or display lighting.

Figure 18B:
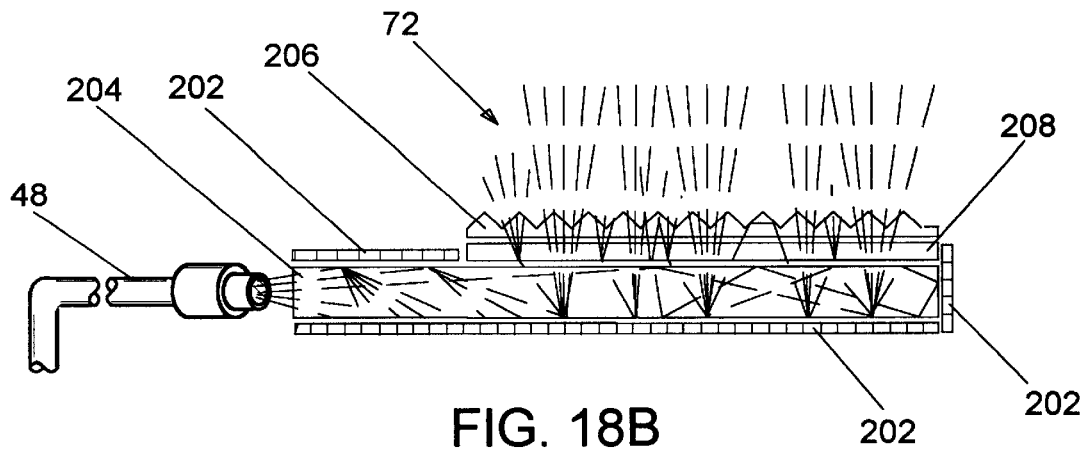
FIGS. 18A and 18B are perspective and cross-sectional views, respectively, of a flat scattering panel according to the present invention.
Figure 18A:
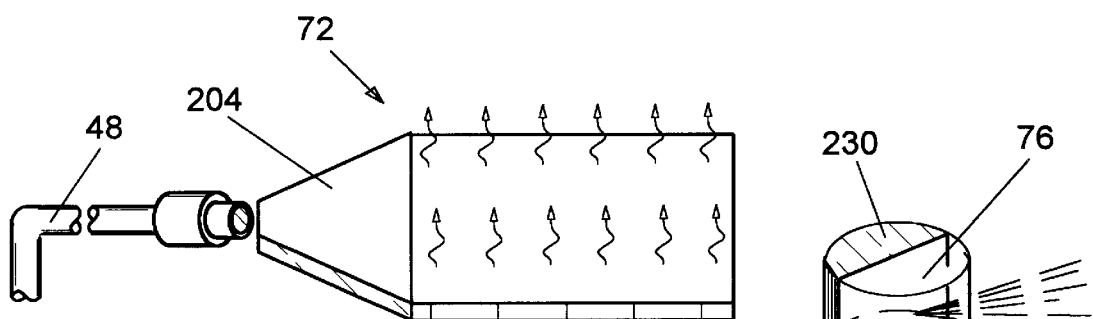

As illustrated in FIGS. 18A and 18B, light emitted from optical fiber 48 may enter light guide/integrating segment 204 of panel 72. Segment 204 is preferably a monolithic component of flat panel 72, and provides more uniform illumination from flat panel 72 than would be provided by coupling of the light from optical fiber 48 directly into flat panel 72. Light guide 204 and the back and edges of panel 72 are preferably provided with a white diffusely reflecting coating 202, such as a white adhesive coating, white paint (based on white light-reflecting materials such as titanium dioxide, barium sulfate, or calcium sulfate, for example), a white polymeric film, or by etching the surfaces of light guide 204 and the back and edges of panel 72. The purpose of this "light extraction coating" is to efficiently diffusely reflect and/or scatter the light so that it eventually exits the front face of panel 72, thereby providing the desired illumination. Coating 202 (in its chosen embodiment) may be uniformly applied to all the surfaces mentioned, or alternatively may be applied in a specific pattern of lines, dots, spots, or other configurations in order to optimize the distribution of the illumination provided by panel 72 in any desired way. Light guide 204 and panel 72 form an integrating chamber in which the light is substantially homogenized, since any rays which are above the critical angle are internally reflected and scattered again from the light extraction coating. The rays exiting the front face of panel 72 may be further diffused/scattered by a thin diffusing film 208 (typically a polymeric film). In addition, a prismatic film 206 may be used to restrict the range of angles for rays exiting the front surface of the panel 72. Rays which exceed some maximum angle (determined by the specific prismatic coating used) are internally reflected back into the panel and scattered again, thereby further enhancing the uniformity and directionality of the illumination provided by panel 72.

FIGS. 19A and 19B show a pair of flat panels 72 arranged back-to-back and sharing coating 202 therebetween. The pair of panels are shown with a pair of light guides 204 receiving light from a pair of optical fiber 48. Such light panels capable of emitting light in two opposite directions may be useful for growing algae and/or other plant material in a restricted volume, and the material thus grown may therefore be useful in space stations or for space exploration as a source of food.

Figure 21:
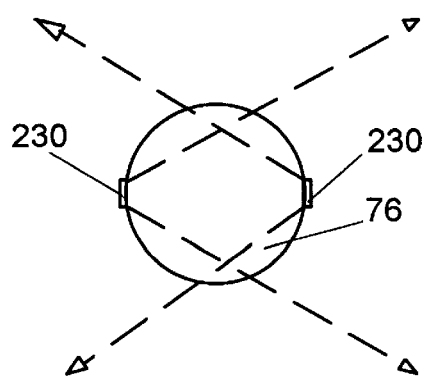
FIG. 21 is a cross-sectional view of a cylindrical scattering rod according to the present invention.
Figure 20:
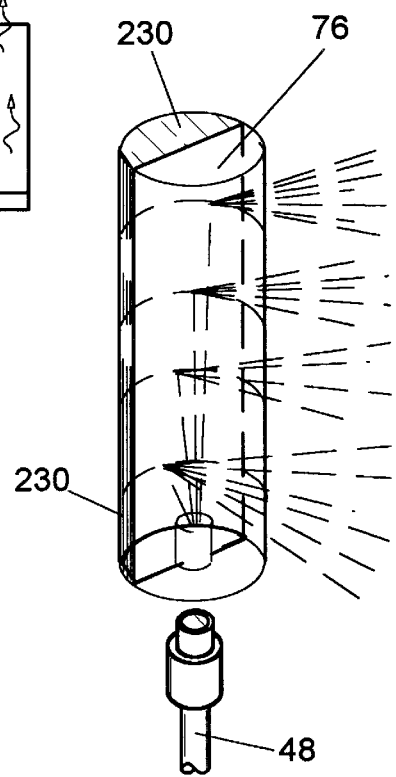
FIG. 20 is a perspective view of a cylindrical scattering rod according to the present invention.

Light from fiber 48 may be diffused in and/or scattered from a linear cylindrical light bar, wand, or rod 76 (shown in detail in FIGS. 20 and 21). Rod 76 may be fabricated from a highly transmissive material (such as acrylic or other polymer) and partially coated with light extracting coating 230 (as described above for flat panels). Light rays entering rod 76 from optical fiber 48 are internally reflected until striking coating 230, at which point they are diffused/scattered and may exit the uncoated portions of rod 76. The cylindrical surface of rod 76 acts as a cylindrical lens and focuses the illumination light emanating from the rod. The range of angles over which the light leaves rod 76 may be controlled by the width of the light extracting coating 230 and by the diameter of the rod. Alternatively, two opposing sections of rod 76 may be coated, as shown in FIG. 21, thereby resulting in two light beams emanating from opposing sides of a single rod.

Figure 22A:
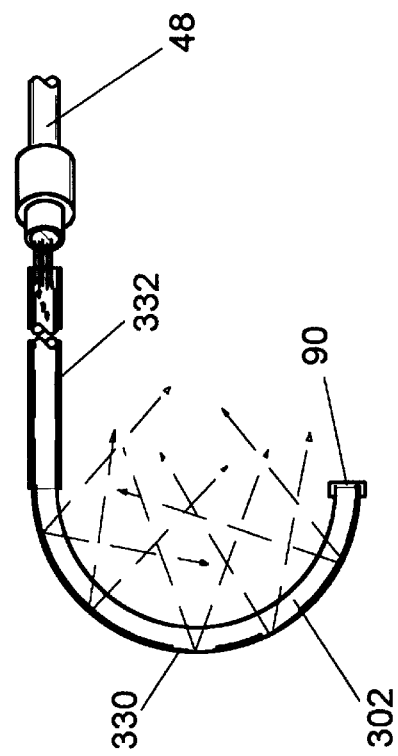
FIGS. 22A and 22B show a scattering optical fiber and an application thereof according to the present invention.
Figure 22B:
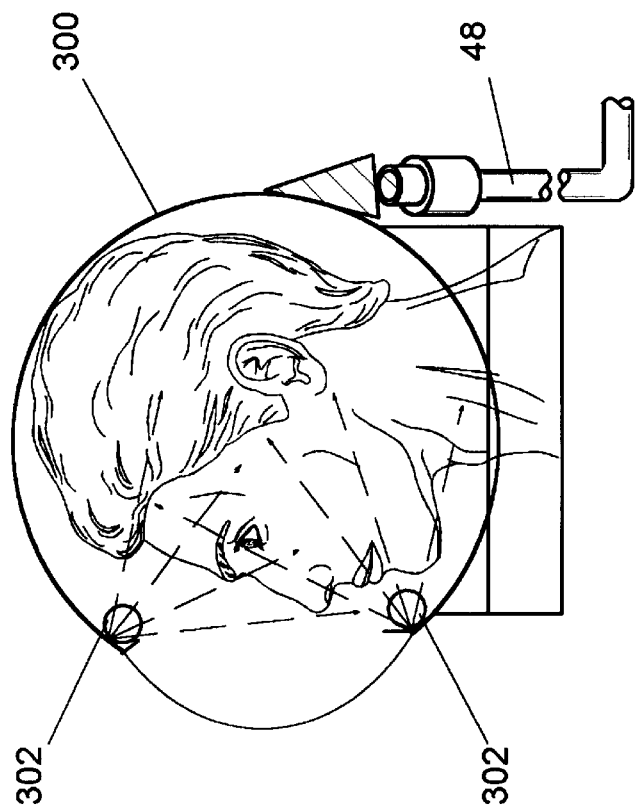

FIG. 22A shows a relatively large diameter optical fiber where cladding 332 has been stripped from fiber core 302 near the end of the fiber, and a strip of light extracting coating 330 applied thereto. The end of the fiber is provided with retro-reflector 90, which redirects any light rays reaching the end of the fiber back into the fiber for further diffusing/scattering. The curved fiber, or light bar, is particularly useful for illuminating round, oval, or semi-circular objects, or other objects requiring wrap-around illumination. FIG. 22B illustrates a particular lighting application of illuminating a person's face within a helmet 300. Such illumination may be many times brighter than fluorescent lamps without the safety concerns of high voltage operation, heat, or glass breakage near a person's face.

Figure 23A:
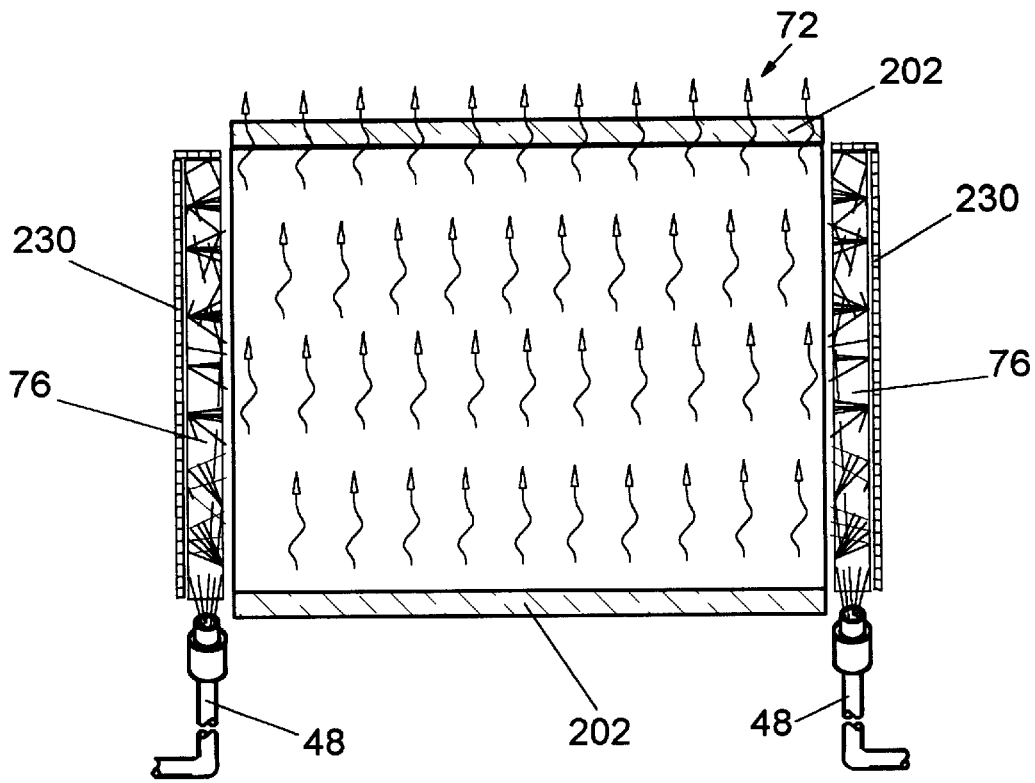
FIGS. 23A, 23B, and 23C show combinations of flat scattering panels and cylindrical scattering rods according to the present invention.
Figure 23B:
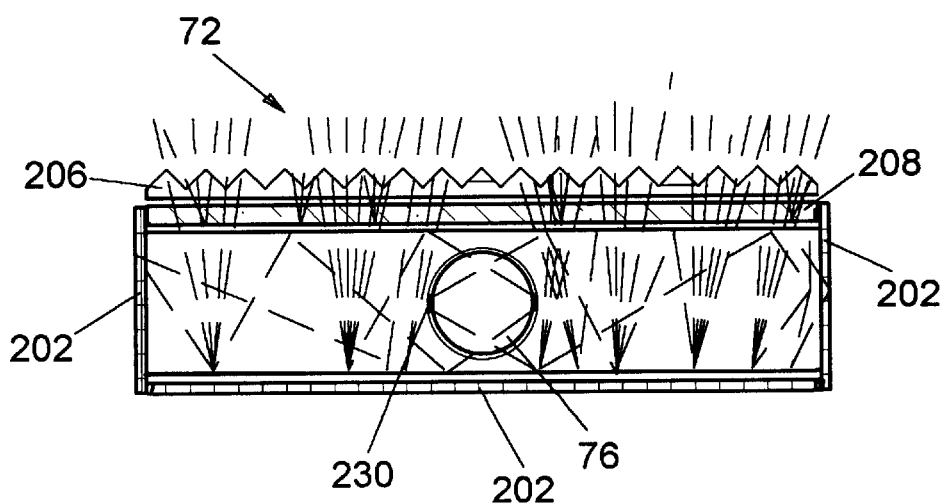
Figure 23C:
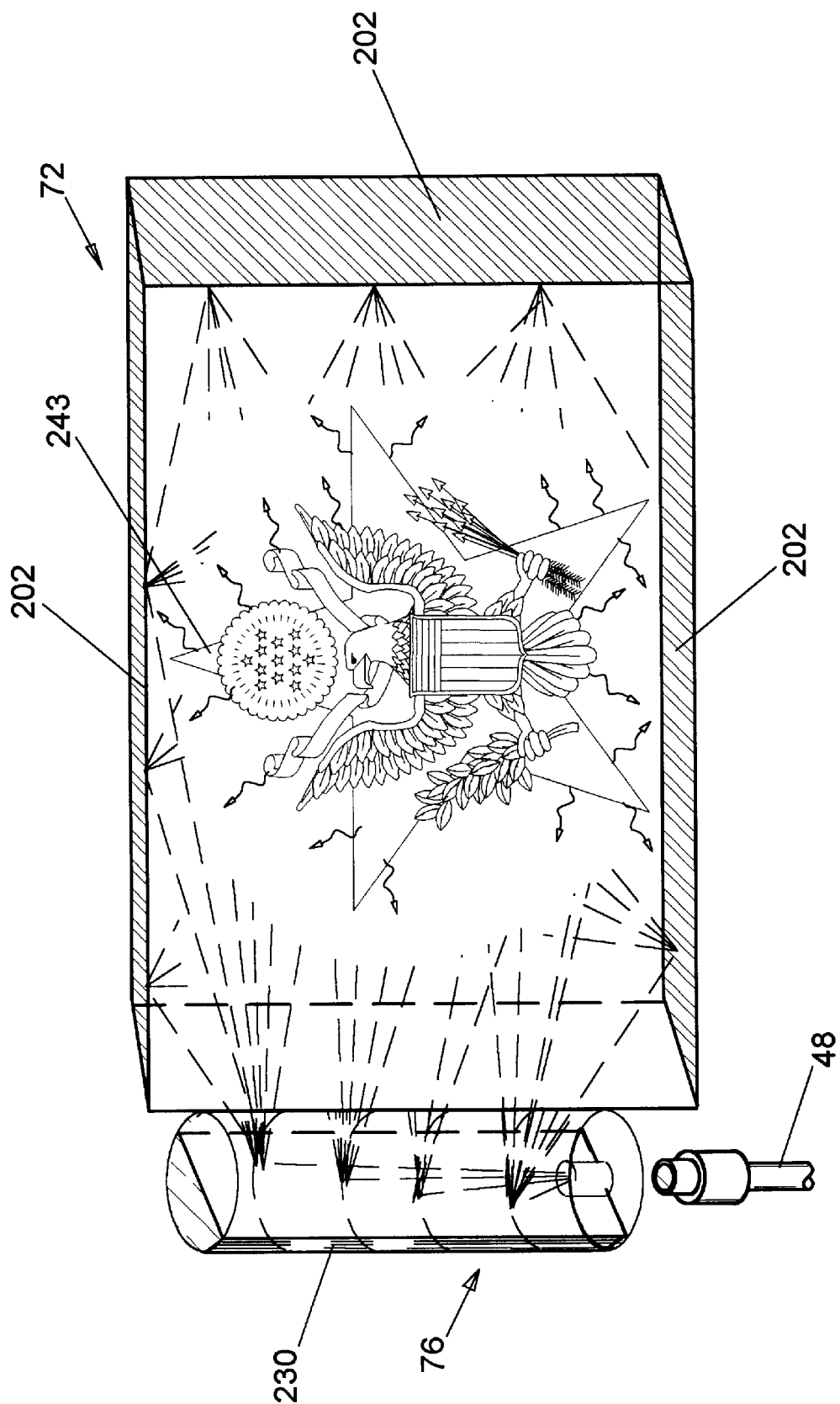

FIGS. 23A, 23B, and 23C illustrate combinations of light emitting rods used in conjunction with flat panels. In FIG. 23A, two rods 76 with light extracting coatings 230 are used to couple light from optical fibers 48 into opposing edges of a flat panel 72. Panel 72 is coated on the back surface and top and bottom edges with light extracting coating 202. In FIG. 23B, a rod 76 with two strips of light extracting coating 230 is embedded within panel 72, and light emitted from rod 76 eventually exits through coatings 208 and 206 on the front of panel 72. FIG. 23C shows a flat panel 72 with an exemplary pattern 243 etched thereon. Light from optical fiber 48 is scattered from rod 76 and enters one edge of the panel. The other three edges are coated with light extracting coating 202, but neither the front of back faces are so coated. The etched pattern 243 therefore appears illuminated against a relatively dark background.

While panels 72 and rods 76 have been described as solid, substantially transparent objects, they may alternatively be constructed as hollow integrating chambers, either coated internally with any suitable white diffusing/scattering material, or made from any suitable white diffusing/scattering material. A particularly well-suited material for fabricating such a hollow panel is obtained by compressing powdered or granulated polytetrafluoroethylene (about 20–500 μm particle size) in an appropriately shaped mold to a density of between about 0.9 and about 1.4 g/cm$^3$ and then sintering the material between about 300° C. and about 500° C. for about 1 to about 4 hours. The resulting hollow panel has a diffuse reflectance typically exceeding 95%, often 98% or even 99%. Use of diffusing film 208 and/or prismatic film 206 as the front surface of such a hollow device results in performance similar to that of the solid device described hereinabove. Hollow devices provide a lightweight but less rugged alternative to solid devices.

FIG. 9 shows the solid state illuminator pumping remote LEC 78 (described hereinabove) using colorless optical fiber 48 pumped with short wavelength light (465 nm, for example) from the illuminator. Remote LEC 78 may emit light from both its sides and its end. FIG. 9 also shows fluorescent fiber optic 80 with retro-reflector 91 being pumped by the solid-state illuminator, for side illumination applications.

In FIGS. 5 and 9 a slide and/or pattern projector 74 is remotely pumped by optical fiber 48 and projects image 96 of slide or pattern 92 through projection optics 94. This application may be especially useful in remote areas where space and/or power sources may not be readily available. The light from fiber optic 48 contains little or no ultraviolet or infrared radiation, thereby providing an ideal light source for the slide and pattern projector. In previous projectors, typically the lamp is close to the slide or pattern, which may not be capable of surviving the intense heat from the lamp without substantial forced-air cooling. The amount of light used to illuminate a slide or pattern in such prior projectors is therefore ultimately limited by the useful temperature range of the slide or pattern material (often polymers limited to use below about 80° C.). The slide and pattern projector 74 in FIGS. 5 and 9 requires no forced-air cooling and higher light intensity can be pumped into slide or pattern 92, enabled by the absence of excessive heat (infrared) and ultraviolet from the lamp. After light passes through the slide or pattern it is focused by lens assembly 94, thereby producing an image 96 on a screen or other opaque surface.

Figure 24:
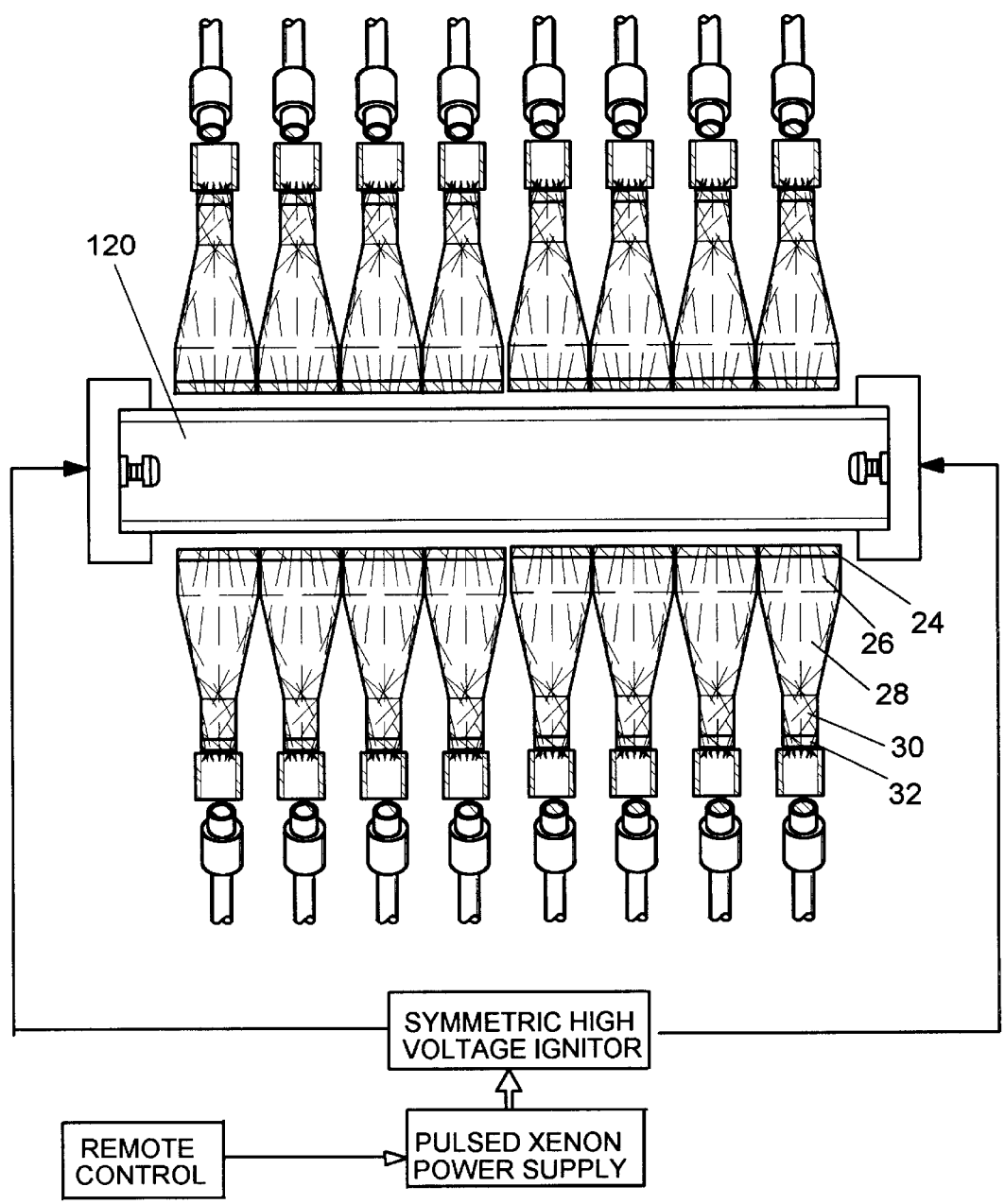
FIG. 24 shows a plurality of waveguides positioned around a long lamp according to the present invention.

FIG. 24 shows a long lamp 120, such as low pressure xenon arc lamp, in which a plurality of waveguides are coupled closely to the lamp envelope and are arrayed to capture maximum light output. The waveguides have a rectangular structure which is best suited for this type of lamp. Other types of rectangular and square waveguides having collecting, condensing, and homogenizing segments are shown in FIGS. 7A, 7B, and 7C. The cylindrical and rectangular waveguides described hereinabove may be constructed using separate components. While this may provide flexibility of design and/or construction of the waveguide, it may come at the expense of substantial Fresnel losses at the various interfaces, or the added difficulty and expense of providing multiple anti-reflection coated surfaces and/or index-matching media.

Figure 25:
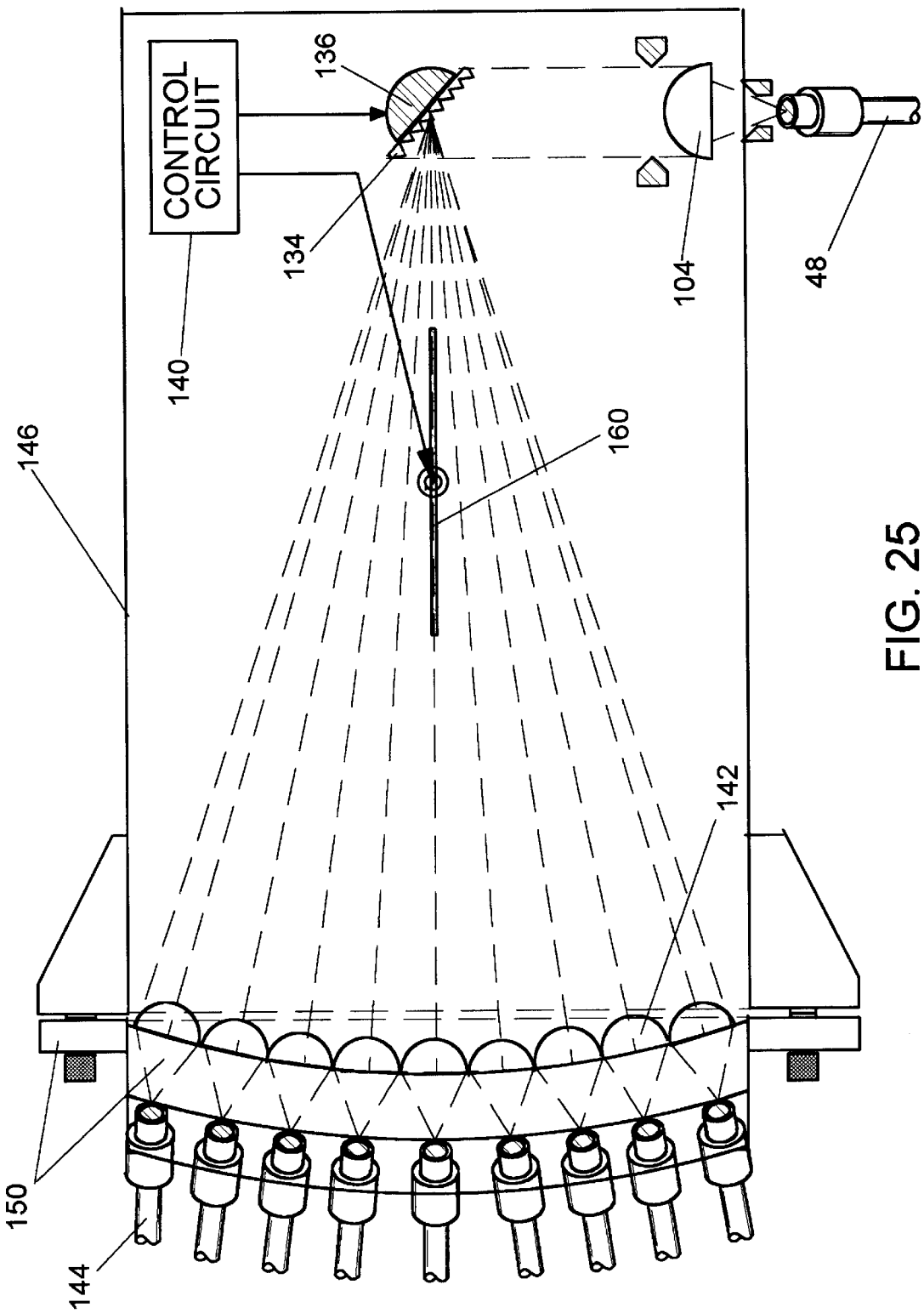
FIG. 25 is a top view of a spectrum generator according to the present invention.
Figure 26:
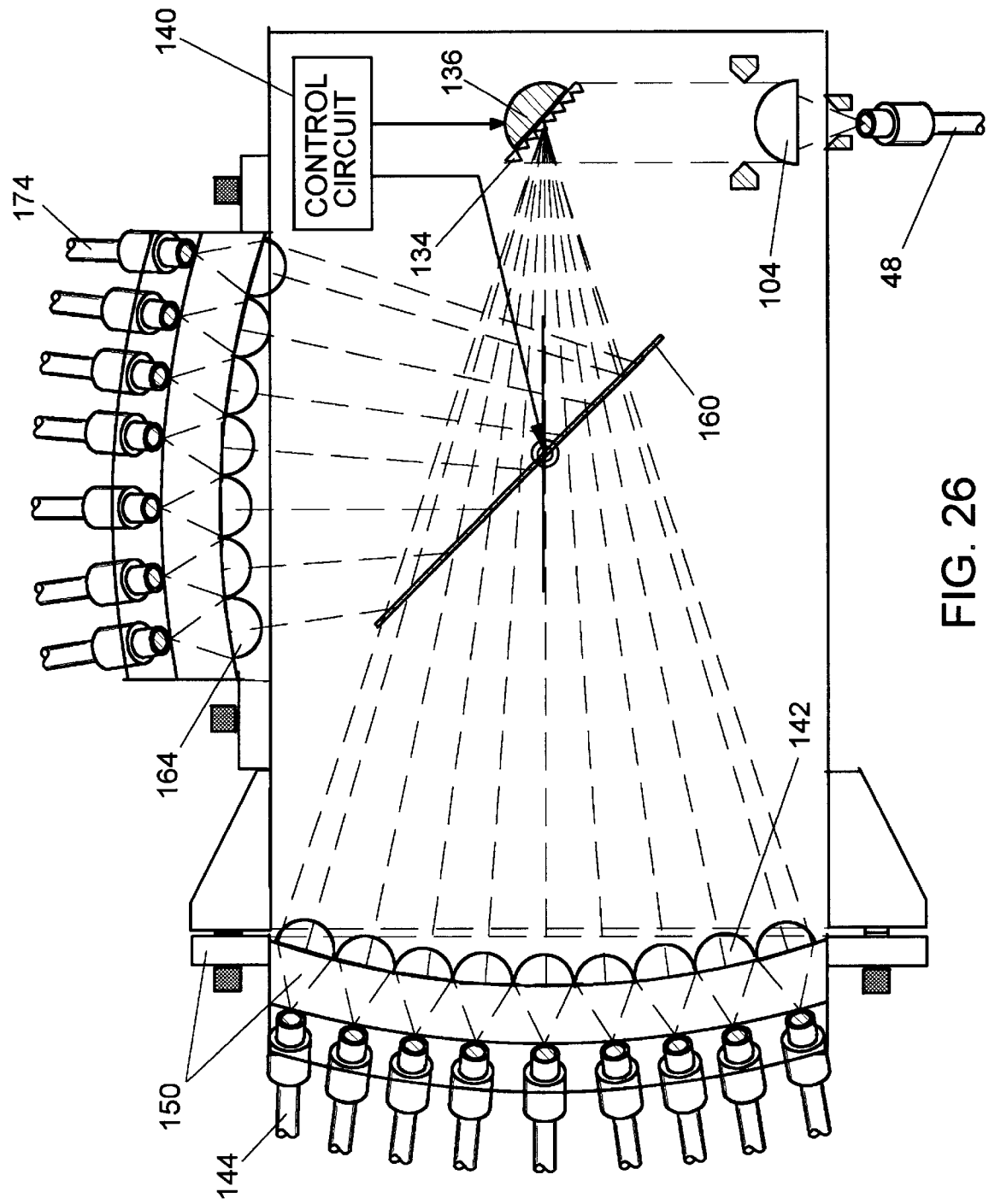
FIG. 26 is a top view of a spectrum generator according to the present invention.
Figure 27:
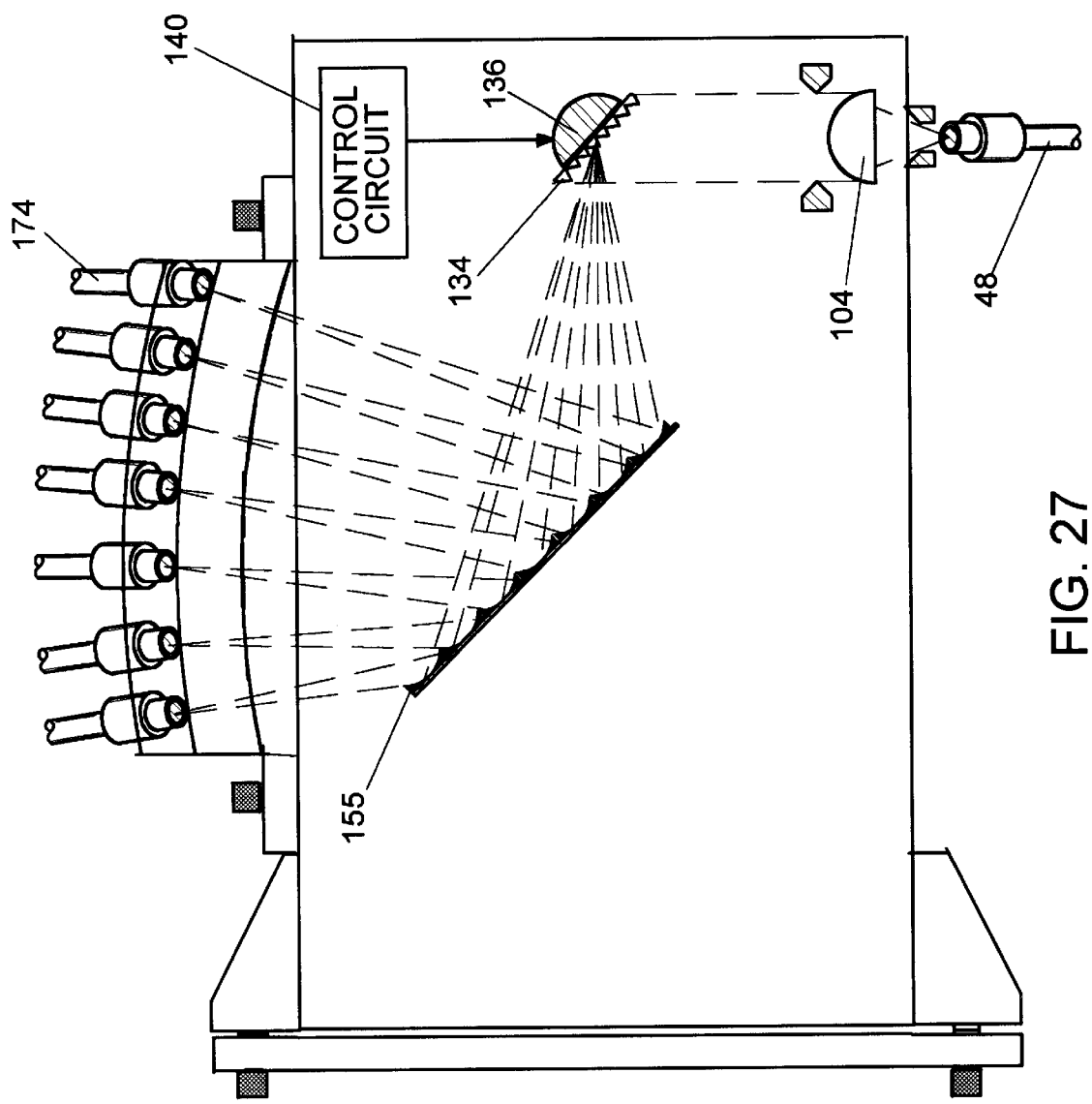
FIG. 27 is a top view of a spectrum generator according to the present invention.

FIG. 25 shows a spectrum generator light output device where fiber optic 48 enters housing 146 where the light is collected and substantially collimated by lens 104. The light is separated into its constituent wavelengths by diffraction grating 134, being dispersed as a function of the angle of incidence, wavelength, and groove spacing of the grating. A preferred grating employed has a groove density between about 600 grooves/mm and about 1200 grooves/mm and is blazed for about 500 nm, although other groove densities and blaze angles may be employed for particular applications. (Useful groove densities may range from about 150 grooves/mm to about 3600 grooves/mm.) Holographic diffraction gratings may also be employed. The diffracted light from the grating is collected by focusing lenses 142 and focused into secondary optical fibers 144. The grating may be rotated using stepping motor 136 which is controlled by a computer-controlled digital-to-analog converter 140, and the secondary optical fibers are mounted on the output plate of the spectrum generator. The output plate 150 may be curved to provide a mounting surface for the focusing lenses 142 which may more efficiently collect the light from the diffraction grating. Alternatively, turning mirror 160 may be used to directed the diffracted light onto a second set of lenses 164 for coupling the light into a second set of secondary optical fibers 174, as shown in FIG. 26. Curved reflectors 155 may be used in place of lenses for coupling into secondary optical fibers 174, as shown in FIG. 27. In any of the various spectrum generators disclosed herein, rotating grating 134 and/or turning mirror 160 may serve to scan the diffracted wavelength components across the secondary fibers 144 and/or 174, varying the wavelength of light emitted from each of the secondary optical fibers. The light thereby coupled into each of secondary optical fibers 144 and/or 174 may be used for various illumination applications, including but not limited to those described hereinabove. Alternative input and output options for the spectrum generator are illustrated in FIGS. 25 through 32.

Figure 28:
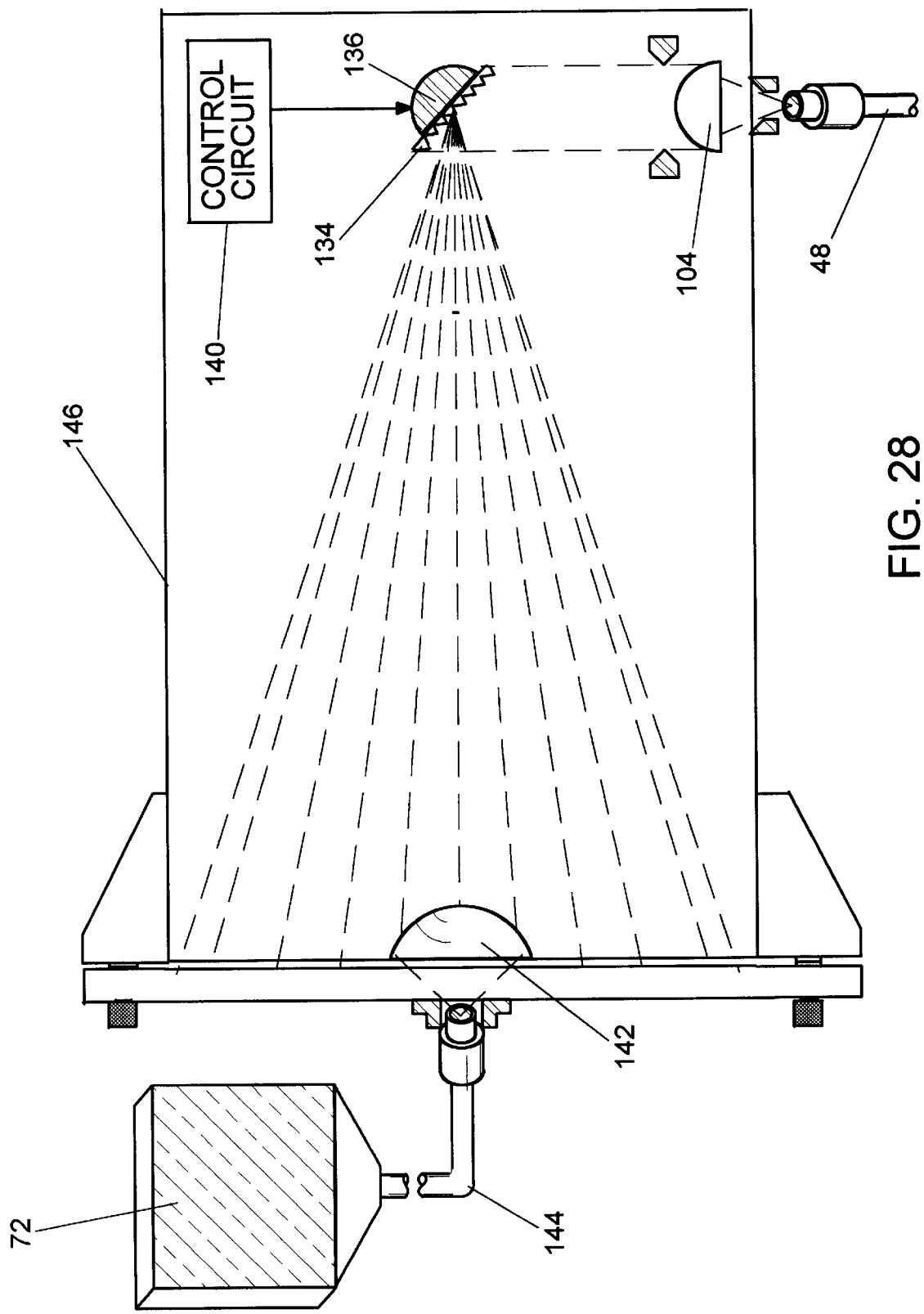
FIG. 28 is a top view of a spectrum generator according to the present invention.
Figure 29:
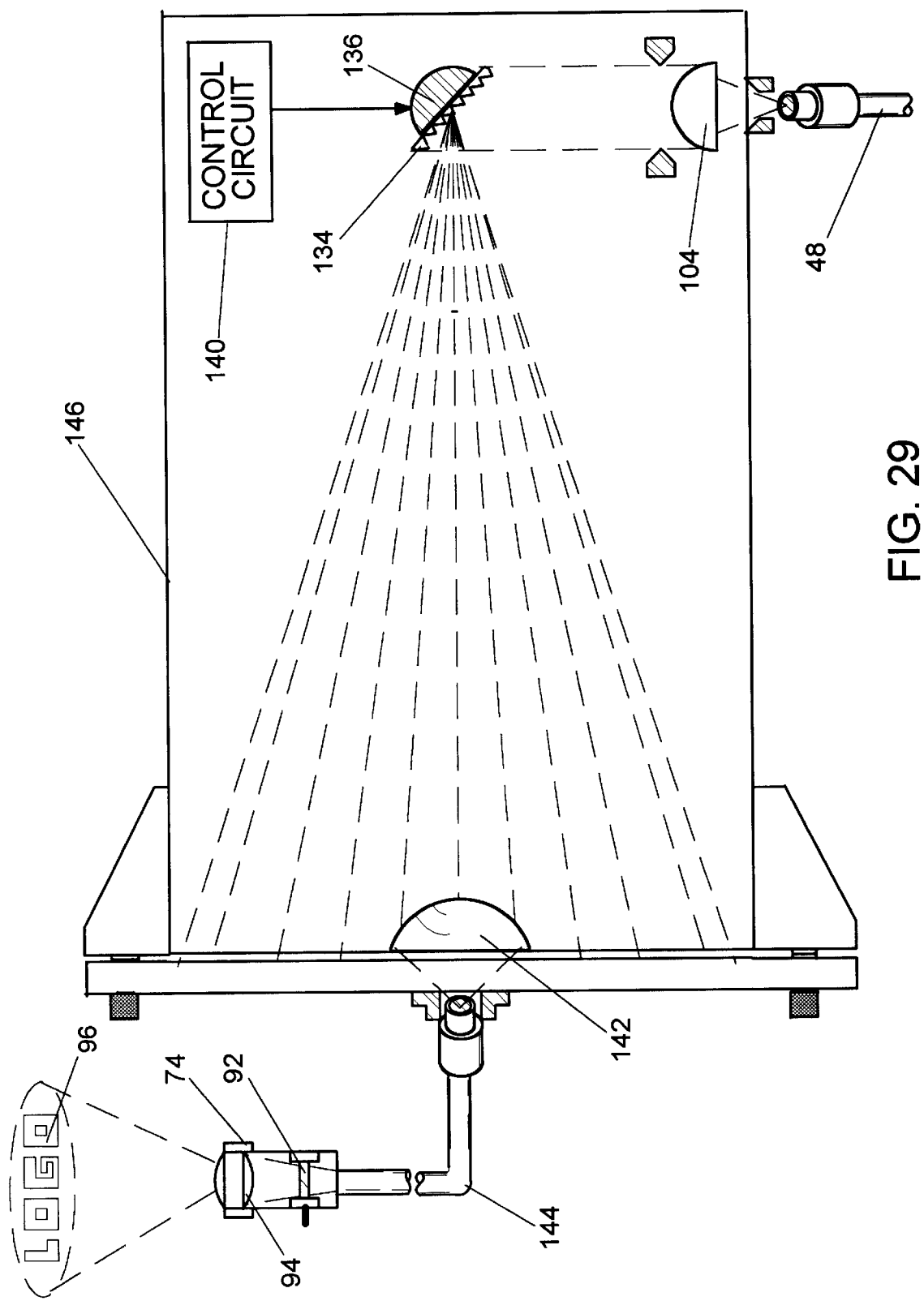
FIG. 29 is a top view of a spectrum generator according to the present invention.
Figure 30:
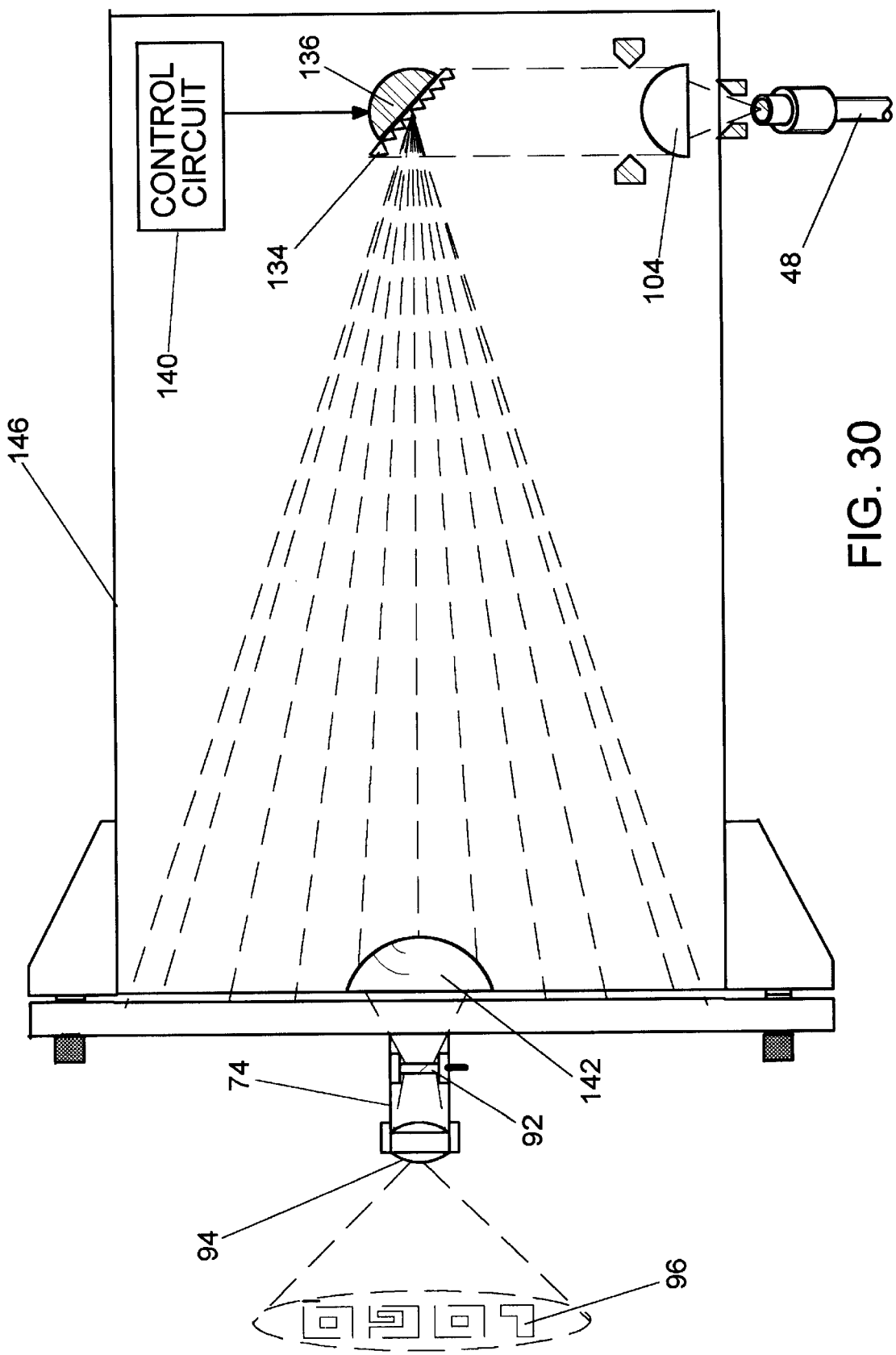
FIG. 30 is a top view of a spectrum generator according to the present invention.
Figure 31:
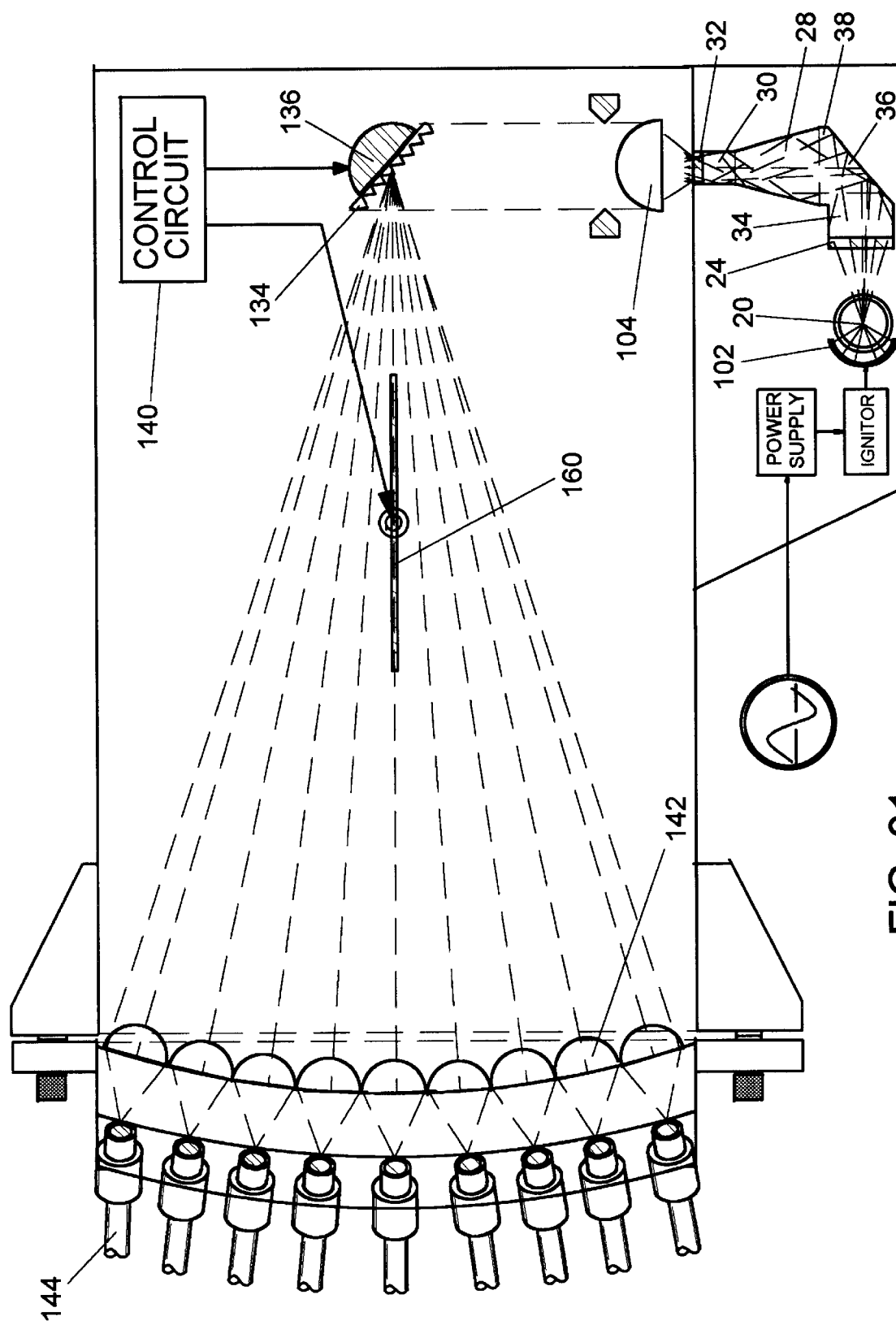
FIG. 31 is a top view of an illuminator with a spectrum generator according to the present invention.
Figure 32:
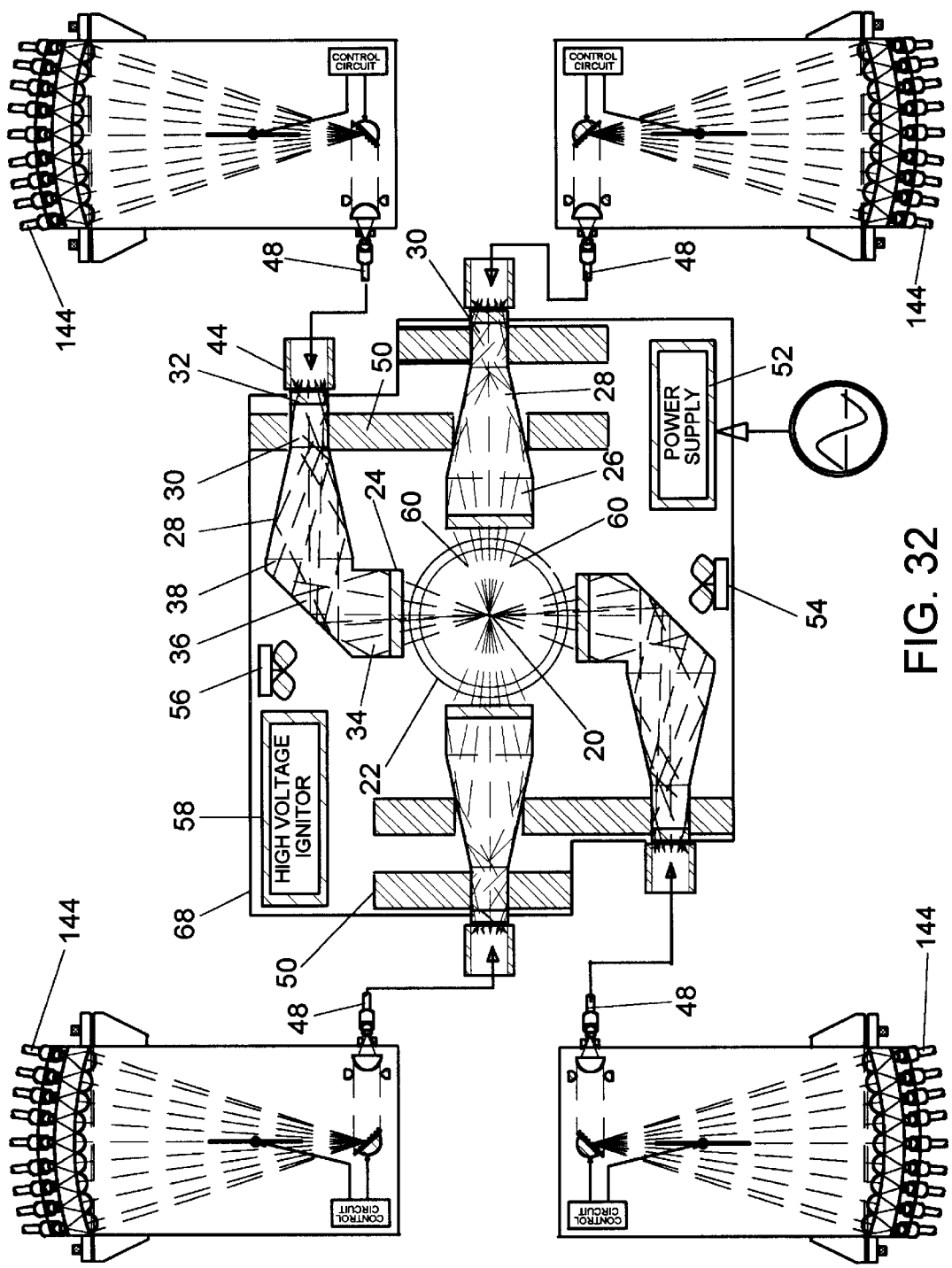
FIG. 32 is a top view of a fiber optic illuminator employing spectrum generators according to the present invention.

FIG. 28 shows a single lens coupling a single diffracted wavelength component from the spectrum generator into a secondary optical fiber for pumping a flat panel used for illumination applications (as described hereinabove). FIG. 29 shows a single lens coupling a single diffracted wavelength component from the spectrum generator into a secondary optical fiber for pumping a slide or pattern projector (as described hereinabove) for projection onto a screen or other opaque surface. Alternatively, the diffracted wavelength component may be coupled directly into a projector, as shown in FIG. 30. Any other light output device described herein may be similarly connected to the output end of a secondary optical fiber. Scanning diffraction grating 134 changes the particular diffracted wavelength component coupled into the secondary optical fiber, thereby changing the color of the light produced at the corresponding light output device (flat panel, cylinder or wand, projector, and so forth). In FIG. 31, light input into the spectrum generator is obtained directly from the output face of a waveguide as described hereinabove. FIG. 32 shows a complete illumination system employing waveguides to transmit light from a light source (a lamp in this case; solid state sources may be used as well) into multiple optical fibers, each of which transmits the light to a spectrum generator.

The present invention has been set forth in the forms of its preferred and alternative embodiments. It is nevertheless intended that modifications to the disclosed optical fiber/waveguide/diffraction grating illumination systems may be made without departing from inventive concepts disclosed and/or claimed herein.

What is claimed is:

1. A fiber optic illuminator, comprising:
   a light source;
   a waveguide for collecting, condensing, and homogenizing light emitted from the light source; and
   an optical fiber, having an input end and an output end, for receiving the light from the waveguide at the input end, transmitting the light, and emitting the light at the output end,
   wherein the waveguide comprises:
     a collecting segment having a substantially constant transverse profile along the length thereof;
     a homogenizing segment having a substantially constant transverse profile along the length thereof; and
     a condensing segment between the collecting segment and the homogenizing segment,
   wherein:
     the homogenizing segment transverse profile is smaller than the collecting segment transverse profile;
     an input end of the condensing segment is connected to an output end of the collecting segment and has a transverse profile substantially the same as the collecting segment transverse profile;
     an output end of the condensing segment is connected to an input end of the homogenizing segment and has a transverse profile substantially the same as the homogenizing segment transverse profile; and
     a transverse profile of the condensing segment tapers along the length thereof from the input end of the condensing segment to the output end of the condensing segment.

2. A fiber optic illuminator as recited in claim 1, wherein the light source comprises a lamp.

3. A fiber optic illuminator as recited in claim 1, wherein the waveguide is fused silica.

4. A fiber optic illuminator as recited in claim 1, further comprising at least one of:

an infrared-reflecting coating applied to at least one of an input end of the collecting segment and an output end of the homogenizing segment; and an ultra-violet-reflecting coating applied to at least one of the input end of the collecting segment and the output end of the homogenizing segment.

5. A fiber optic illuminator as recited in claim 1, wherein the transverse profile of the collecting segment is substantially rectangular.

6. A fiber optic illuminator as recited in claim 1, wherein the transverse profile of the of the collecting segment is substantially circular.

7. A fiber optic illuminator as recited in claim 1, wherein the collecting segment includes a bend and a flat face for internally reflecting the light, thereby redirecting the light around the bend.

8. A fiber optic illuminator as recited in claim 1, wherein:
   the collecting segment is between about 2 mm long and about 150 mm long and between about 3 mm wide and about 100 mm wide;
   the condensing segment tapers at an angle between about 0.5° and about 20°;
   the homogenizing segment is between about 5 mm long and about 100 mm long; and
   the transverse profile of the homogenizing segment substantially corresponds to a transverse profile of the input end of the optical fiber.

9. A fiber optic illuminator as recited in claim 8, wherein:
   the collecting segment is between about 10 mm long and about 100 mm long and between about 5 mm wide and about 50 mm wide;
   the condensing segment tapers at an angle between about 2° and about 12°; and
   the homogenizing segment is between about 20 mm long and about 80 mm long.

10. A fiber optic illuminator as recited in claim 8, wherein the optical fiber has a core diameter of between about 1 mm and about 30 mm.

11. A fiber optic illuminator as recited in claim 10, wherein the optical fiber has a core diameter of between about 3 mm and about 15 mm.

12. A fiber optic illuminator as recited in claim 1, wherein the light source comprises at least one solid-state light source.

13. A fiber optic illuminator as recited in claim 12, wherein the light source comprises a plurality of LED's, each LED emitting light of at least one of a plurality of primary colors.

14. A fiber optic illuminator as recited in claim 13, wherein a light output level of each of the plurality of primary colors may be independently controlled, thereby enabling a plurality of secondary colors to be produced at the output end of the optical fiber.

15. A fiber optic illuminator as recited in claim 13, wherein the emitted light of the plurality of primary colors produces white light at the output end of the optical fiber.

16. A fiber optic illuminator as recited in claim 12, wherein the solid-state light source emits light of a primary color shorter than about 550 nm in wavelength, and the optical fiber is doped with at least one fluorescent dye that absorbs the light of the primary color and emits light of a secondary color, the emitted secondary color being emitted from at least one of the output end and sides of the optical fiber.

17. A fiber optic illuminator as recited in claim 16, wherein:

the solid-state light source emits light of a primary color shorter than about 480 nm in wavelength;

the optical fiber is doped with a plurality of fluorescent dyes each emitting light of one of a plurality of secondary colors;

at least one of the plurality of fluorescent dyes absorbs the light of the primary color; and the emitted light of at least two of the primary color and the plurality of secondary colors produces white light at the output end of the optical fiber.

18. A fiber optic illuminator as recited in claim 16, wherein light of the secondary color is produced at the output end of the optical fiber.

19. A fiber optic illuminator as recited in claim 1, further comprising a light output device connected to the output end of the optical fiber and receiving the light emitted therefrom.

20. A fiber optic illuminator as recited in claim 19, wherein the light output device comprises a substantially flat scattering panel.

21. A fiber optic illuminator as recited in claim 19, wherein the light output device comprises a projection system.

22. A fiber optic illuminator as recited in claim 19, wherein the light output device comprises a substantially cylindrical scattering rod.

23. A fiber optic illuminator as recited in claim 19, wherein the light output device comprises a wavelength selector.

24. A fiber optic illuminator as recited in claim 23, wherein the wavelength selector comprises a diffraction grating and a projection system, wherein the projection system receives and projects a wavelength component of the light diffracted by the diffraction grating.

25. A fiber optic illuminator as recited in claim 23, wherein the wavelength selector comprises a plurality of wavelength selecting filters.

26. A fiber optic illuminator as recited in claim 23, wherein the wavelength selector comprises a diffraction grating and a secondary optical fiber, the secondary optical fiber having an input end and an output end, for receiving at the input end a wavelength component of light diffracted by the diffraction grating, transmitting the diffracted wavelength component, and emitting the diffracted wavelength component at the output end.

27. A fiber optic illuminator as recited in claim 26, further comprising a secondary light output device connected to the output end of the secondary optical fiber and receiving the light emitted therefrom.

28. A fiber optic illuminator as recited in claim 26, wherein the diffraction grating may be scanned, thereby changing the wavelength of the diffracted wavelength component transmitted by the secondary optical fiber.

29. A fiber optic illuminator as recited in claim 26, further comprising a plurality of secondary optical fibers each receiving, transmitting, and emitting a respective diffracted wavelength component of the light diffracted by the diffraction grating.

30. A fiber optic illuminator as recited in claim 26, wherein the diffracted wavelength component is coupled into the input end of the secondary optical fiber by a lens.

31. A fiber optic illuminator as recited in claim 26, wherein the diffracted wavelength component is coupled into the input end of the secondary optical fiber by a curved mirror.

32. A waveguide for a fiber optic illuminator, comprising:
a collecting segment for collecting light from a light source and having a substantially constant transverse profile along the length of the collecting segment;

a homogenizing segment for transmitting light to an optical fiber and having a substantially constant transverse profile along the length of the homogenizing segment; and a condensing segment between the collecting segment and the homogenizing segment, wherein:

the homogenizing segment transverse profile is smaller than the collecting segment transverse profile;

an input end of the condensing segment is connected to an output end of the collecting segment and has a transverse profile substantially the same as the collecting segment transverse profile;

an output end of the condensing segment is connected to an input end of the homogenizing segment and has a transverse profile substantially the same as the homogenizing segment transverse profile; and a transverse profile of the condensing segment tapers along the length thereof from the input end of the condensing segment to the output end of the condensing segment.

33. A waveguide as recited in claim 32 for a fiber optic illuminator, wherein:

the collecting segment is between about 2 mm long and about 150 mm long and between about 3 mm wide and about 100 mm wide;

the condensing segment tapers at an angle between about 0.5° and about 20°;

the homogenizing segment is between about 5 mm long and about 100 mm long and between about 1 mm wide and about 30 mm wide.

34. A waveguide as recited in claim 33 for a fiber optic illuminator, wherein:

the collecting segment is between about 10 mm long and about 100 mm long and between about 5 mm wide and about 50 mm wide;

the condensing segment tapers at an angle between about 2° and about 12°; and the homogenizing segment is between about 20 mm long and about 80 mm long and between about 3 mm wide and about 15 mm wide.

35. A waveguide as recited in claim 32 for a fiber optic illuminator, further comprising at least one of:

an infrared-reflecting coating applied to at least one of an input end of the collecting segment and an output end of the homogenizing segment; and an ultra-violet-reflecting coating applied to at least one of the input end of the collecting segment and the output end of the homogenizing segment.

36. A waveguide as recited in claim 32 for a fiber optic illuminator, wherein the transverse profile of the collecting segment is substantially rectangular.

37. A waveguide as recited in claim 32 for a fiber optic illuminator, wherein the transverse profile of the of the collecting segment is substantially circular.

38. A waveguide as recited in claim 32 for a fiber optic illuminator, wherein the collecting segment includes a bend and a flat face for internally reflecting the light, thereby redirecting the light around the bend.

39. A waveguide as recited in claim 32 for a fiber optic illuminator, wherein the waveguide is fused silica.

* * * * *